(12) United States Patent
Heath

(10) Patent No.: US 6,364,933 B1
(45) Date of Patent: Apr. 2, 2002

(54) APPARATUS FOR USE WITH A NATURAL GAS DEHYDRATOR

(76) Inventor: Rodney T. Heath, 109 W. 31st. St., Farmington, NM (US) 87401

( * ) Notice: Subject to any disclaimer, the term of this patent is extended or adjusted under 35 U.S.C. 154(b) by 0 days.

(21) Appl. No.: 09/565,885

(22) Filed: May 5, 2000

Related U.S. Application Data

(63) Continuation-in-part of application No. 09/333,115, filed on Jun. 15, 1999, now Pat. No. 6,238,461.

(51) Int. Cl.[7] .......................... B01D 47/00; B01D 53/26
(52) U.S. Cl. ............................ 95/24; 95/161; 95/163; 95/166; 95/231; 95/251; 96/160; 96/163; 96/165; 96/173; 96/193; 96/247; 96/266
(58) Field of Search .......................... 95/161–163, 166, 95/169, 174–180, 186, 187, 227–231, 24, 251; 96/158, 165, 168, 182–185, 193, 245, 250, 262, 266, 157, 160, 163, 173

(56) References Cited

U.S. PATENT DOCUMENTS

| | | | | |
|---|---|---|---|---|
| 2,225,959 A | * | 12/1940 | Miller | 95/231 X |
| 2,726,729 A | * | 12/1955 | Williams | 96/184 X |
| 2,786,543 A | * | 3/1957 | Hayes et al. | 96/184 |
| 2,984,360 A | * | 5/1961 | Smith | 96/184 X |
| 3,254,473 A | * | 6/1966 | Fryar et al. | 95/180 |
| 3,321,890 A | * | 5/1967 | Barnhart | 95/231 X |
| 3,347,019 A | * | 10/1967 | Barnhart | 95/231 X |
| 3,396,512 A | * | 8/1968 | McMinn et al. | 95/24 |
| 3,648,434 A | * | 3/1972 | Gravis, III et al. | 95/231 X |
| 3,659,401 A | * | 5/1972 | Giammarco | 95/175 |
| 3,672,127 A | * | 6/1972 | Mayse et al. | 96/184 X |
| 4,010,065 A | * | 3/1977 | Alleman | 95/169 X |
| 4,162,145 A | * | 7/1979 | Alleman | 95/174 |
| 4,342,572 A | * | 8/1982 | Heath | 96/173 |
| 4,431,433 A | * | 2/1984 | Gerlach et al. | 95/231 |
| 4,511,374 A | * | 4/1985 | Heath | 96/173 X |
| 4,659,344 A | * | 4/1987 | Gerlach et al. | 95/231 |
| 4,676,806 A | * | 6/1987 | Dean et al. | 95/231 X |
| 4,689,053 A | * | 8/1987 | Heath | 95/231 X |
| 5,084,074 A | * | 1/1992 | Beer et al. | 95/231 X |
| 5,129,925 A | * | 7/1992 | Marsala et al. | 95/24 X |
| 5,163,981 A | * | 11/1992 | Choi | 95/231 X |
| 5,167,675 A | * | 12/1992 | Rhodes | 95/231 X |
| 5,346,537 A | * | 9/1994 | Lowell | 95/166 X |
| 5,453,114 A | * | 9/1995 | Ebeling | 95/166 |
| 5,490,873 A | * | 2/1996 | Behrens et al. | 95/166 X |
| 5,536,303 A | * | 7/1996 | Ebeling | 95/166 |
| 5,665,144 A | * | 9/1997 | Hill et al. | 95/179 |
| 5,766,313 A | | 6/1998 | Heath | 95/161 |
| 6,004,380 A | * | 12/1999 | Landreau et al. | 95/174 |
| 6,010,674 A | * | 1/2000 | Miles et al. | 95/231 X |
| 6,183,540 B1 | * | 2/2001 | Thonsgaard | 95/166 |
| 6,238,461 B1 | * | 5/2001 | Heath | 95/161 |

* cited by examiner

*Primary Examiner*—Robert H. Spitzer
(74) *Attorney, Agent, or Firm*—Klass, Law, O'Meara & Malkin, P.C.; Joseph J. Kelly; William P. O'Meara

(57) ABSTRACT

Apparatus for use with a natural gas dehydrator wherein a portion of the wet glycol in an emissions separator is pumped under pressure as circulating wet glycol which may be used as a coolant for effluent removed from a reboiler and/or a power source for an eductor to form a vacuum in a first chamber of a liquid water removal separator apparatus. The cooled effluent, comprising at least liquid water, liquid hydrocarbons and uncondensed vapors, moves into the first chamber wherein the liquid water and/or the liquid hydrocarbons are separated from the uncondensed vapors. At least, the uncondensed vapors are removed from the first chamber and move into the eductor wherein they are compressed and combined into the circulating wet glycol. The separated liquid water is transferred to a second chamber of the liquid water removal separator apparatus and then removed therefrom. In some instances, the liquid hydrocarbons are transferred to a third chamber and removed therefrom. Apparatus is also provided to remove liquid hydrocarbons from the emissions separator. Also, gases from gas emitting level control apparatus are collected and fed into the first chamber.

27 Claims, 6 Drawing Sheets

US 6,364,933 B1

APPARATUS FOR USE WITH A NATURAL GAS DEHYDRATOR

This application is a continuation-in-part application of U.S. patent application Ser. No. 09/333,115 filed Jun. 15, 1999 by Rodney T. Heath for Natural Gas Dehydrator, now U.S. Pat. No. 6,288,461.

FIELD OF THE INVENTION

This invention relates generally to apparatus for use with natural gas dehydrators of the type used to remove water and water vapor from a natural gas stream composed of a mixture of natural gas, liquid hydrocarbons, liquid hydrocarbon vapors, water and water vapors and is particularly directed to apparatus for use with field natural gas dehydrators.

BACKGROUND OF THE INVENTION

An example of such a field natural gas dehydrator is disclosed in U.S. Pat. No. 5,766,313 to Rodney Thomas Heath and the disclosure therein is specifically incorporated herein by reference thereto. In general, such systems comprise a separator means for receiving the oil and water liquids from "wet" (water vapor laden) gas; and a water absorber means, which employs a liquid dehydrating agent such as glycol, for removing the water vapor from the wet gas and producing "dry" gas suitable for commercial usage. The glycol is continuously supplied by a pump to the absorber means in a "dry" low-water vapor-pressure condition and is removed from the absorber means in a "wet" high-water vapor-pressure condition. The wet glycol is continuously removed from the absorber means and circulated through a reboiler means, which includes a still column, for removing the absorbed water from the glycol and heating the glycol to provide a new supply of hot dry glycol. Heating of the glycol in the reboiler means is generally accomplished through use of a gas burner mounted in a fire tube. The hot dry glycol from the reboiler means passes through a heat exchanger, where the hot dry glycol transfers some of its heat to incoming wet glycol going to the still column. The dry glycol subsequently passes to a dry glycol storage tank. A glycol passage means is provided to enable passage of wet glycol from the absorber means to the reboiler means and to pump dry glycol from the storage tank to the absorber means. Besides water, the wet glycol going to the still column of the reboiler of the natural gas dehydrator will contain natural gas and absorbed hydrocarbons.

On many dehydrators, a volume of natural gas is intentionally induced into the reboiler in order to dry the wet glycol to a higher concentration than can be accomplished by simply adding heat. The process of intentionally inducing a volume of natural gas into the reboiler is referred to as gas stripping.

In the still column of the reboiler of the natural gas dehydrator, the water, natural gas, and other hydrocarbons are separated from the glycol by the pressure reduction from the absorber pressure to approximately atmospheric pressure in the still column and by the application of heat from the burner in the fire tube of the reboiler.

The water, natural gas, and other hydrocarbons contained in the wet glycol stream which are separated in the still column from the wet glycol will be exhausted into the atmosphere through the atmospheric vent on the still column. The hydrocarbon vapors released through the still column of a natural gas dehydrator are air pollutants. Specifically, certain hydrocarbons such as benzene, toluene, ethylbenzene, and xylene, commonly referred to as BTEX have been proven to be carcinogenic.

The gas dehydrator disclosed in U.S. Pat. No. 5,766,313 offers solutions to at least some of the problems discussed above but improvements can be made to such a gas dehydrator.

BRIEF DESCRIPTION OF THE INVENTION

This invention provides apparatus for use with a field natural gas dehydrator in which the wet glycol from the absorber is fed into a three phase emissions separator apparatus which is provided with suitable apparatus, such as an overflow tank, that contains an amount of wet glycol, part of which is used as a circulating medium as described more fully below, and routes another part of the wet glycol, such as an amount equal to the amount of wet glycol received from the absorber, to a reboiler. In the description of the invention, the apparatus is described in its operating condition. The circulating wet glycol is used to cool the emissions from the still column of a reboiler and to provide the energy to create a vacuum using an eductor as described more fully below. By using the part of the wet glycol as the pump circulating medium, the lubricity, vapor pressure, viscosity, and etc. of the circulating medium remain relatively constant from dehydrator to dehydrator; therefore overcoming potential pump problems which could occur if a circulating medium with changing physical constants, from dehydrator to dehydrator, was used.

Also, the wet glycol can be pumped in greater volumes and used as a heat exchange medium for condensing the effluent from the still column of the reboiler. As explained more fully below, the volume of the wet glycol being pumped by the circulating pump is 20 to 30 times greater than the volume of the wet glycol exiting the absorber.

In one embodiment, this invention also provides a liquid water separator and removal apparatus that collects the liquid water condensed from the effluent from the still column so that substantially no water in the form of vaporized water or liquid water is returned into the emissions separator. Ideally, substantially all of the water in the vaporized water in the effluent is changed into liquid water in an effluent condenser apparatus and is fed into and removed in the liquid water separator and removal apparatus. This is accomplished in the instant invention by cooling the effluent to a temperature in the effluent condenser that condenses substantially all of the vaporized water and even some of the vaporized hydrocarbons to produce liquid hydrocarbons.

The invention also provides a system for collecting the gases from the level controllers used in the natural gas dehydrator so that the collected gases may be used as fuel for the burner of the reboiler.

In accordance with one embodiment of this invention, a natural gas dehydrator is provided wherein a supply of natural gas is fed into an absorber wherein it is subjected to dry glycol to remove undesirable materials therefrom so that the dry glycol is changed into wet glycol that is removed from the absorber and fed at reduced pressure into a first separator comprising a three phase emissions separator apparatus. When the invention is under operating conditions, the three phase emissions separator apparatus has liquid level control apparatus that provides for holding a predetermined amount of wet glycol some of which is to be circulated as described below and some of which wet glycol that is transferred to the still column of a reboiler apparatus that receives the wet glycol and changes such amount of wet glycol into dry glycol and vaporized effluent. Under operating conditions, the amount of wet glycol being transferred to the reboiler is substantially equal to the amount of wet glycol being fed into the three phase emissions separator apparatus from the absorber. An effluent condenser apparatus is provided for receiving the vaporized effluent. The effluent condenser apparatus comprises a hollow shell having a tube extending therethrough wherein the tube has an external spiral fin. The hollow shell has an inlet and an outlet so that the wet glycol can be circulated therethrough. The effluent from the still column is fed into the tube and is cooled by the circulating wet glycol. Circulating apparatus is provided for circulating wet glycol from the three phase emissions separator apparatus through the effluent condenser apparatus to change the vaporized effluent to at least liquid water, liquid hydrocarbons and uncondensed vapors, which are substantially hydrocarbon vapors, and returning the circulating wet glycol with other ingredients entrained therein to the three phase emissions separator apparatus. Second separator apparatus comprising liquid water separator and removal apparatus is provided for receiving the at least liquid water, liquid hydrocarbons and uncondensed vapors for separating and removing the liquid water. Additional apparatus is provided for removing the liquid hydrocarbons and the uncondensed vapors from the liquid water separator and removal apparatus and feeding the liquid hydrocarbons and the uncondensed vapors to the three phase emissions separator apparatus.

The additional apparatus comprises an eductor having an inlet port, an exit port and a vacuum port. A first conduit through which the circulating wet glycol flows is connected to the inlet port. A second conduit extends between the outlet port and the three phase emissions separator apparatus. A third conduit extends between the liquid water separator and removal apparatus and the vacuum port of the eductor to form at least a relative vacuum in the liquid water separator and removal apparatus.

The liquid water separator and removal apparatus comprises a hollow shell having a partition therein for forming at least a first and a second chamber in the hollow shell. A first outlet port is formed in the first chamber and is connected to the third conduit so that a vacuum is formed in the first chamber. A first inlet port is formed in the first chamber so that the at least liquid water, liquid hydrocarbons and uncondensed vapors from the condenser apparatus can flow into the first chamber and be separated into at least an upper layer comprising the uncondensed vapors, a middle layer comprising the liquid hydrocarbons and a lower layer comprising the liquid water. The first outlet port is located so that the uncondensed vapors and the liquid hydrocarbons can flow through the first outlet port into the third conduit. The withdrawn uncondensed vapors and the liquid hydrocarbons enter the eductor and are compressed and entrained into the wet glycol and flow with the wet glycol from the eductor to the three phase emissions separator. A second outlet port is formed in the first chamber and a second inlet port is formed in the second chamber. A conduit connects the second outlet port and the second inlet port so that the liquid water can flow from the first chamber into the second chamber. A drain port is formed in the second chamber for draining liquid water from the second chamber.

The natural gas dehydrator has at least one gas emitting level control apparatus. Each of the three phase emissions separator apparatus and the liquid water separator and removal apparatus has a gas emitting level control apparatus. A gas inlet port is formed in the liquid water separator and removal apparatus. Collecting apparatus is provided for collecting the gases emitted from the gas emitting level control apparatus and conduits extend between the collecting apparatus and the gas inlet port for transmitting the gases to the gas inlet port.

In the operation of the above-described apparatus a supply of natural gas is fed into an absorber wherein it is subjected to dry glycol to remove undesirable materials therefrom so that the dry glycol is changed into wet glycol that is removed from the absorber and is processed by feeding the wet glycol from the absorber into the three phase emissions separator apparatus; retaining a supply of wet glycol to a predetermined level in the three phase emissions separator apparatus; feeding wet glycol greater than the predetermined level from the three phase emissions separator apparatus to the still column of a reboiler for changing such wet glycol into dry glycol and vaporized effluent; feeding the vaporized effluent to a condenser apparatus; circulating wet glycol into and out of the retained wet glycol in the three phase emissions separator apparatus so that wet glycol flows through the condenser apparatus to change the vaporized effluent to at least liquid water, liquid hydrocarbons and uncondensed vapors and returns the circulating wet glycol with other added materials to the three phase emissions separator apparatus; feeding the at least liquid water, liquid hydrocarbons and uncondensed vapors to a liquid water separator and removal apparatus; separating and removing the liquid water from the at least liquid water, liquid hydrocarbons and uncondensed vapors; draining the removed liquid water; and entraining the at least liquid hydrocarbons and the uncondensed vapors into the circulating wet glycol to be returned to the three phase emissions separator apparatus.

A vacuum is formed in the liquid water separator and removal apparatus by positioning an eductor having an inlet port, an outlet port and a vacuum port between the liquid water separator and removal apparatus and the three phase emissions separator apparatus; feeding the circulating wet glycol to the inlet port; passing the circulating wet glycol through the eductor and out of the outlet port to create a vacuum to draw the uncondensed vapors and liquid hydrocarbons from the liquid water separator and removal apparatus; compressing the uncondensed vapors and entraining them with any liquid hydrocarbons into the circulating wet glycol; and feeding the circulating wet glycol with the entrained condensed vapors and liquid hydrocarbons from the outlet port into the three phase emissions separator apparatus.

The removal of the liquid water is accomplished by forming a first and a second chamber in the liquid water separator and removal apparatus; feeding the at least liquid water, liquid hydrocarbons and uncondensed vapors into the first chamber; separating the at least liquid water, the liquid hydrocarbons and uncondensed vapors in the first chamber; removing the liquid hydrocarbons and the uncondensed vapors from the first chamber; entraining the removed uncondensed vapors and liquid hydrocarbons into the wet glycol in the eductor; transferring at least a portion of the liquid water from the first chamber to the second chamber until the liquid water in the second chamber reaches a predetermined level; and removing at least a portion of the liquid water from the second chamber.

Additional gas is transferred to the first chamber by providing at least one gas emitting level control apparatus in at least the absorber, the three phase emissions separator apparatus and the liquid water separator and removal apparatus; collecting the gases emitted by the gas emitting level control apparatus; and feeding the collected gases into the first chamber.

In another embodiment of the effluent condenser apparatus, the finned tube is connected to the effluent piping carrying the effluent issuing from the still column and is located within the hollow shell as described above. Also the hollow shell has longitudinally extending external fins. The modified effluent condenser apparatus is located within a hollow tube having a diameter greater than the external fins of the hollow shell. The hollow tube has an enlarged cross section at one end wherein a fan is located to blow air over the finned hollow shell. Also, a portion of the tubing through which the cooled effluent passes is exposed to the air. A thermostat is located in the piping or line carrying the cooled effluent comprising hydrocarbon gas, liquid hydrocarbon, water and water vapors from the effluent condenser apparatus to the liquid separator and removal apparatus. The fan is turned on or off in response to the temperature in the cooled effluent as described below.

In a further embodiment of the effluent condenser apparatus, the wet glycol is not passed through the hollow shell. In this embodiment, only the finned tubing is located within the hollow tube having the fan located therein. A thermostat is also located in the line carrying the cooled effluent from the effluent condenser to the liquid separator and removal apparatus and turns the fan on or off in response to the sensed temperature.

In another embodiment of the invention, a two phase emission separator apparatus is used instead of the three phase emission separator apparatus and such two phase emission separator apparatus is described more fully below.

In another embodiment of the invention, a modified liquid separator and removal apparatus acts on the cooled effluent to separate and remove both the liquid water and the liquid hydrocarbons from the cooled effluent leaving at least uncondensed hydrocarbon gases which are drawn from the liquid separator and removal apparatus by the vacuum formed by the eductor as described above.

This modified liquid separator and removal apparatus comprises a hollow shell having two sealed partitions therein for dividing the hollow shell into first, second and third chambers. The first chamber receives the cooled effluent comprising at least liquid water, liquid hydrocarbons and uncondensed vapors. The first chamber has a first outlet port through which the uncondensed vapors, having at least hydrocarbon gases, are drawn into the eductor by the vacuum therein. A second outlet port in the first chamber removes the liquid hydrocarbons from the first chamber and deposits the liquid hydrocarbons in the second chamber from which they are removed as described below. A third outlet port in the first chamber removes the liquid water from the first chamber and deposits the liquid water into the third chamber from which they are removed as described below.

The invention also provides a heat exchanger for heating the wet glycol flowing from the two or three phase emission separator. Wet glycol is moved from the two or three phase emission separator through a heat exchanger coil within the storage tank for the hot dry glycol received from the reboiler whereby the temperature of such wet glycol is raised. This higher temperature processed wet glycol is then passed through an outer shell of a heat exchanger which has a finned tubing encased therein. The circulating wet glycol from the two or three phase emissions separator apparatus passes through the finned tubing so that the temperature of the circulating wet glycol therein is raised. The passage of the circulating wet glycol through the finned tubing in the heat exchanger is controlled by a thermostat associated with the two or three phase emissions separator apparatus.

The operation of the invention using the wet glycol heat exchanger, the effluent condenser apparatus wherein the wet glycol is used to treat the effluent from the still column and the modified liquid separator and removal apparatus is as follows. The effluent issuing from the still column is fed into the finned tubing in the effluent condenser apparatus. The wet glycol flows in the hollow shell around the hot effluent in the finned tubing to produce a treated effluent comprising at least liquid hydrocarbons, liquid water and uncondensed vapors containing at least gaseous hydrocarbons all of which pass out of the effluent condenser apparatus and into the modified liquid separator and removal apparatus. The thermostat senses the temperature of the circulating wet glycol and determines whether or not the circulating wet glycol from the emissions separator apparatus is or is not to be passed through the heat exchanger by the operation of a valve controlled by the thermostat. When the valve is fully closed, the circulating wet glycol is fed to the effluent condenser apparatus. When the valve is fully open, the circulating wet glycol is fed through the heat exchanger and the liquid separator and removal apparatus to the eductor. As the valve moves between the fully opened and fully closed positions, the amount of the circulating wet glycol passed through the heat exchanger is proportionally changed. In some instances, it may be necessary to use the fan to further cool the effluent passing through the pipe in the effluent condenser apparatus. The treated effluent enters the first chamber of the modified liquid separator and removal apparatus wherein the uncondensed vapors are removed by the vacuum in the eductor; the liquid hydrocarbons are removed from the first chamber to the second chamber and the liquid water is removed from the first chamber to the third chamber. When the liquid hydrocarbons in the second chamber reach a predetermined level, at least a portion of the liquid hydrocarbons in the second chamber are removed therefrom. When the liquid water in the third chamber reaches a predetermined level, at least a portion of the liquid water is removed therefrom. The circulating wet glycol passes through the eductor to create the above-described vacuum and the uncondensed vapors from the modified liquid separator and removal apparatus are compressed and entrained in the circulating wet glycol and then pass into the emissions separator apparatus.

The operation of the invention not using the circulating wet glycol in the effluent condenser apparatus but using the heat exchanger and the modified liquid separator and removal apparatus is as follows. The hot effluent from the still column flows into the finned tubing in the effluent condenser apparatus. A fan, controlled by another thermostat, operates to cool the hot effluent to produce at least liquid hydrocarbons, liquid water and uncondensed vapors containing at least gaseous hydrocarbons. If the outside temperature is low enough, it is generally not necessary to operate the fan to cool the hot effluent. Also, the thermostat in the emissions separator apparatus or tubing or piping functions to determine whether or not the circulating wet glycol from the emissions separator apparatus is passed through the heat exchanger. When the valve is fully closed, the circulating wet glycol is fed through a heated coil in the liquid separator and removal apparatus and then to the eductor. When the valve is fully opened, the circulating wet glycol is fed through the heat exchanger and then directly to the eductor. The treated effluent flows into the modified liquid separator and removal apparatus and is processed thereafter as described above.

In another embodiment of the invention, prevention apparatus is provided to prevent the inadvertent transfer of liquid hydrocarbons to the reboiler and in particular from the two phase emissions separator apparatus. The build up of liquid hydrocarbons in a two or three phase emissions separator apparatus can result from the liquid hydrocarbons in the wet glycol from the absorber, the carryover from the liquid separator and removal apparatus and the further condensation of the hydrocarbon gases in the two or three phase emissions separator apparatus. The prevention apparatus is described preferably in relation to a two phase emissions separator apparatus and comprises a throttling liquid level control apparatus that is set to control the level of the total liquids in the emissions separator apparatus which total level comprises liquid hydrocarbons and wet glycol. A float that is weighted to float on top of the wet glycol is connected to apparatus for opening or closing a solenoid valve for purposes described below. A casing having a closed lower end and an open upper end is located at a preset location in the emissions separator apparatus. A pipe having an open bottom end is located within the casing and its open bottom is located about one inch from the closed lower end and has its other open top end connected to the solenoid valve. The emissions separator apparatus has a lower level of wet glycol, an intermediate level of liquid hydrocarbons and an upper level of gaseous hydrocarbons. An open ended tube has its upper open end located in the emissions separator apparatus so that it is in the gaseous hydrocarbon level and its lower open end located adjacent to but spaced from the bottom of the emissions separator apparatus so that it is located in the wet glycol level. An open ended pipe has a portion thereof located in the open ended tube so that its lower open end is located to be exposed under normal conditions to the wet glycol. The upper open end of the open ended pipe is secured to a dumping apparatus for transferring wet glycol from the emissions separator apparatus to the still column.

In the operation of the prevention apparatus, when there is only a relatively small amount of liquid hydrocarbons in the emissions separator apparatus, the float on the wet glycol will close the solenoid valve and the throttling liquid level apparatus will operate to dump wet glycol to the still column of the reboiler as the wet glycol from the absorber enters the emissions separator apparatus. When the level of the liquid hydrocarbons reaches a predetermined amount, the level of the wet glycol will reach a lower level at which time the float will open the solenoid valve so that the liquid hydrocarbons will flow through the solenoid valve since the emissions separator apparatus is at a pressure higher than atmospheric. This causes a drop in the total liquid level in the emissions separator apparatus so that the throttling liquid level control apparatus shuts off the dumping apparatus so that no wet glycol is transferred to the still column of the reboiler. Since the wet glycol from the absorber continues to enter the emissions separator apparatus, the level of the wet glycol will start to rise in the emissions separator apparatus. Since the liquid hydrocarbons are dumped at a rate greater than the rate of entry into the emissions separator apparatus of the wet glycol from the absorber, a substantial amount of the liquid hydrocarbons will be dumped before the level of the wet glycol in the emissions separator apparatus raises the weighted float to a level to close the solenoid valve. When the total level of liquid hydrocarbons and wet glycol is detected by the throttling liquid level control apparatus, wet glycol from the emissions separator apparatus will again be dumped to the reboiler.

BRIEF DESCRIPTION OF THE DRAWINGS

Preferred embodiments of the invention are illustrated in the drawings in which.

DETAILED DESCRIPTION OF THE INVENTION

Figure 1:
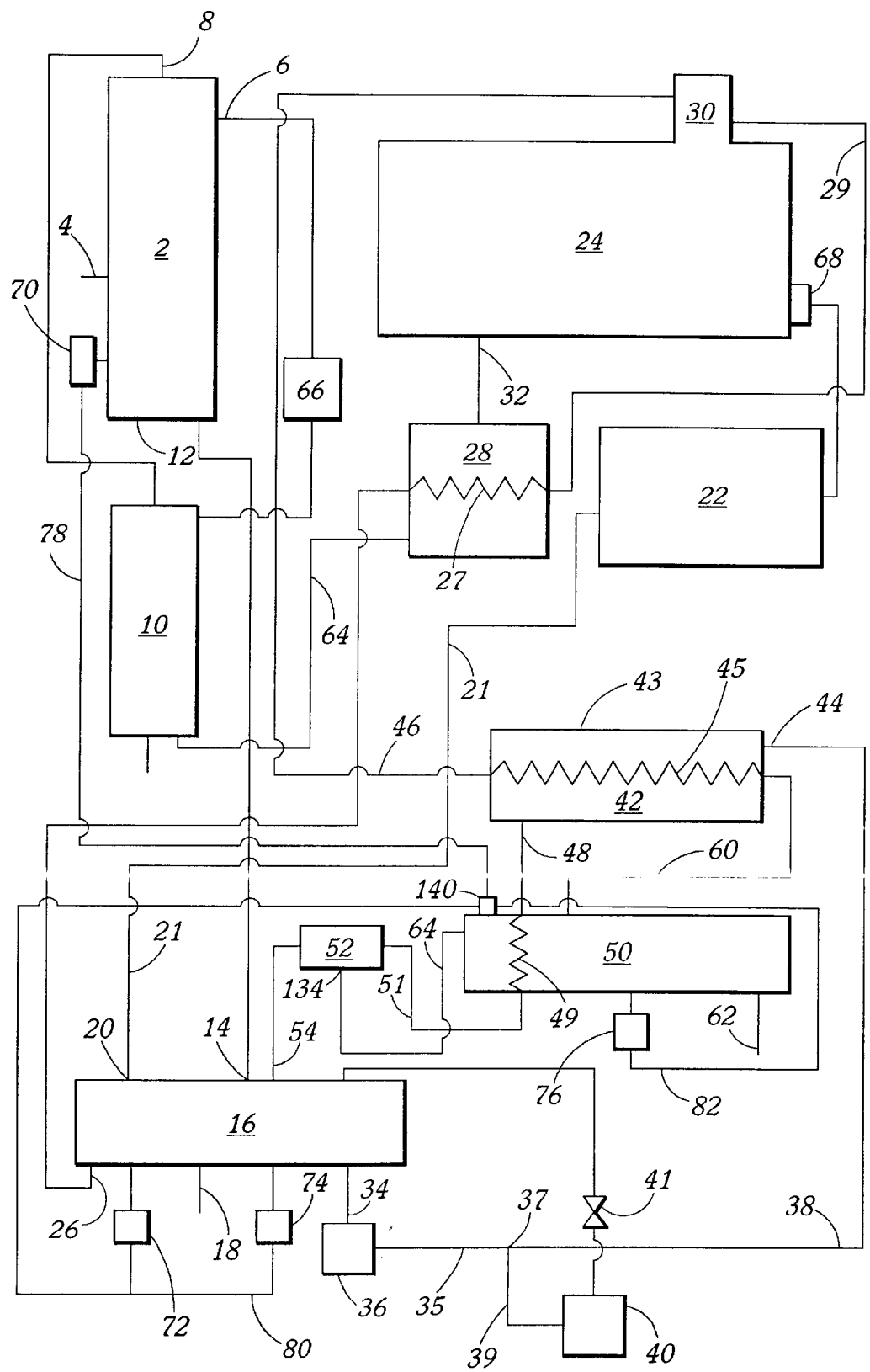
FIG. 1 is a block diagram of the invention.
Figure 2:
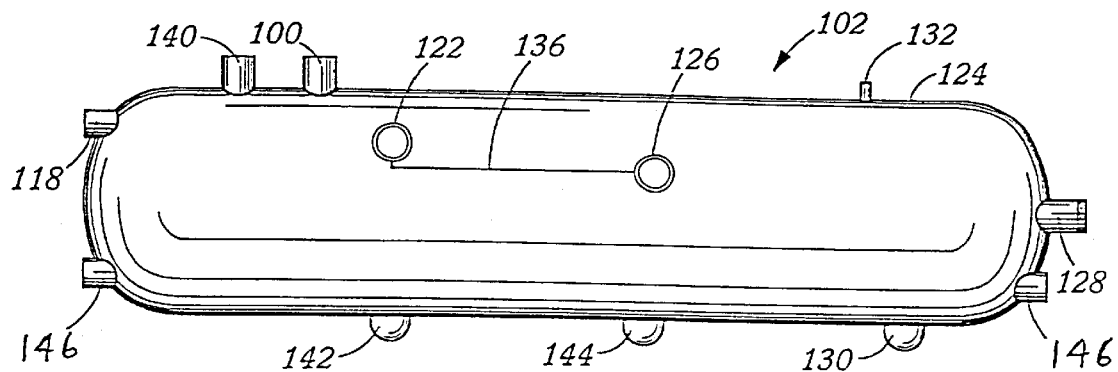
FIG. 2 is a schematic elevational view of the liquid water separator and removal apparatus.

This invention is directed toward apparatus for use with a field natural gas dehydrator such as the one described in U.S. Pat. No. 5,766,313, the disclosure of which is specifically incorporated herein by reference thereto. The volume and pressure of the natural gas flowing through the system can vary in wide ranges. Each unit is designed by those skilled in the art to perform at wide ranges of volume and pressure of the natural gas being processed and various controls have been associated with the natural gas dehydrators so that these dehydrators can be operated in a conventional manner by those skilled in the art. The operation of the various portions of this invention uses such conventional apparatus that are normally used in the operation of a natural gas dehydrator. Therefore, the specific parameters associated with the operation of the various components of this invention are parameters known by those skilled in the art. Some parameters are given. In accordance with this invention, the natural gas is first passed through a conventional three phase inlet separator (not shown) to remove water and liquid hydrocarbons therefrom. The natural gas is then fed into an absorber 2, FIG. 1, through an inlet 4 so that the natural gas can flow upwardly through the absorber. Dry glycol is introduced through inlet 6 and flows through spaced apart bubble trays (not shown) into the absorber and then downwardly through the absorber. The dry glycol functions primarily to remove water from the natural gas and becomes wet glycol. The treated natural gas exits through outlet 8 in the top portion of the absorber 2 and is passed through a glycol-gas heat exchanger 10 and passes out as dry salable natural gas at relatively high pressures, for example of 50 PSIG to 1500 PSIG depending on the operating pressures of the pipeline system.

The wet glycol is collected in a wet glycol sump 12 in the bottom portion of the absorber 2 and flows under control to the inlet port 14 of a conventional three phase emissions separator apparatus 16. Free gaseous hydrocarbons contained in the wet glycol will be released in the three phase emissions separator as a result of the reduction of pressure from the pressure of the absorber of between about 50 and 1500 PSIG to the pressure in the three phase emissions separator which is between about 10 and 15 PSIG and preferably about 15 PSIG. This is accomplished by conventional apparatus. Liquid hydrocarbons are separated from the wet glycol in the three phase emissions separator apparatus 16 by a weir system and are withdrawn through outlet 18. The wet glycol is collected in one part of the three phase emissions separator apparatus 16 to a predetermined level and then the processed wet glycol flows to another part of the three phase emissions separator. The flow of the wet glycol from the absorber to the three phase emissions separator is controlled by the amount of dry glycol required to remove the water vapor from the natural gas being processed. The amount of dry glycol used is in the range of 3 to 6 gallons of dry glycol for each pound of water removed. The amount of dry glycol used is determined in a conventional manner.

The freed gaseous hydrocarbons exit through outlet 20 in the top portion of the three phase emissions separator apparatus 16 and flow through conduit 21 into a system 22 as described in the '313 patent to be used as fuel in a reboiler 24 as described more fully below.

Once the predetermined level of wet glycol has been reached in the three phase emissions separator apparatus 16, any additional amount of wet glycol such as that from the absorber 2 may be mixed with the predetermined level of wet glycol and the same additional amount of wet glycol passes under control from the three phase emissions separator apparatus 16 through pipe 26 and then through a coil 27 in the dry glycol storage 28 and then through pipe 29 to the still column 30 of the reboiler 24 wherein the wet glycol is changed into hot dry glycol which is then fed through line 32 into the dry glycol storage 28. The coil 27 functions as a heat exchanger to raise the temperature of the wet glycol passing through the coil 27. The effluent from the still column, liquid water, liquid hydrocarbons, vaporized water, gases and vaporized hydrocarbons are processed as described more fully below.

Wet glycol is withdrawn from the predetermined level of wet glycol in the three phase emissions separator apparatus 16 through outlet 34 and enters a pump 36 which circulates the wet glycol through transmission lines into an effluent condenser 42.

In one example, the pump 36 feeds wet glycol into the line 35 at a preferable rate of at least 20 gallons per minute and at a preferable pressure of at least about 50 PSIG or greater to provide a sufficient flow of wet glycol through an eductor (described below) and to provide side stream filtration of any wet glycol not required to power the eductor. At point 37, the line 35 is divided into transmission line 38 and a side stream line 39 which carries any excess circulating wet glycol to a particulate filter 40. A manually adjustable valve 41 controls the flow of wet glycol through the particulate filter 40 so that cleaned wet glycol flows into the emissions separator apparatus 16. A valve (not shown) in line 39 permits the closing of line 39 so that the particulate filter 40 may be changed as necessary. The pump 36 and the adjustable valve 41 ensure that sufficient wet glycol is being circulated through line 38 to operate the eductor so that only excess circulating wet glycol flows through the particulate filter 40.

The effluent condensor 42 comprises a hollow shell 43 having a finned tubing 45 located therein. The effluent from the still column 30 flows through piping 46 and enter into the finned tubing 45. The wet glycol enters at one end 44 of the effluent condensor 42 and flows around the finned tubing 45. The wet glycol functions to cool the effluent in the finned tubing 45. Using the wet glycol circulating as described above greatly increases the cooling efficiency of the effluent condensor 42. The amount of wet glycol circulating through the condenser system is substantially greater than the amount of wet glycol exiting from the absorber 2 and is about 20 to 30 times greater than the amount of wet glycol exiting from the absorber 2. The wet glycol then flows through outlet 48 of the effluent condenser 42 through suitable piping and flows through a conduit 49 in a liquid water separator and removal apparatus 50 and through line 51 into the power inlet port of a conventional eductor 52 for creating a vacuum source that forms a vacuum in the liquid water separator and removal apparatus 50 for purposes described more fully below. The wet glycol flows out of the eductor 52 and, together with entrained other materials as described below, is passed into the three phase emissions separator apparatus 16 through line 54.

The cooled effluent flows out of the effluent condensor 42 through line 60 and enters the liquid water separator and removal apparatus 50 wherein water is removed, as described below, through drain 62. The system for removing the water is discussed more fully below. Hydrocarbon vapors and any unseparated liquid water and liquid hydrocarbons are drawn out of the liquid water separator and removal apparatus 50 by the vacuum in the eductor 52 through line 64 and enter into the eductor and are entrained and compressed into the wet glycol passing through the eductor and move with the wet glycol into the three phase emissions separator apparatus 16 through line 54. The hydrocarbon vapors in the three phase emissions separator apparatus 16 flow out thereof, as described above, the wet glycol flows into the still column, as described above, or is used to maintain the predetermined level of wet glycol in the three phase emissions separator apparatus 16. If any liquid hydrocarbon is formed in the three phase emissions separator apparatus 16, it is removed therefrom through outlet 18.

The dry glycol for the absorber 2 is drawn from the dry glycol storage 28 through line 64 and flows through the glycol gas heat exchanger 10 and enters an electric pump 66 or equivalent to enter the absorber 2 through inlet 6.

The hydrocarbon vapors leaving the three phase emissions separator are fed into a system 22 wherein the hydrocarbon vapors alone or in conjunction with a supplemental fuel source are used to fire the burner 68 in the reboiler. The wet glycol entering the still column of the reboiler is dried and exits from the reboiler into a dry glycol storage tank through line 32. This system 22 is similar to that disclosed in U.S. Pat. No. 5,766,313.

Figure 3:
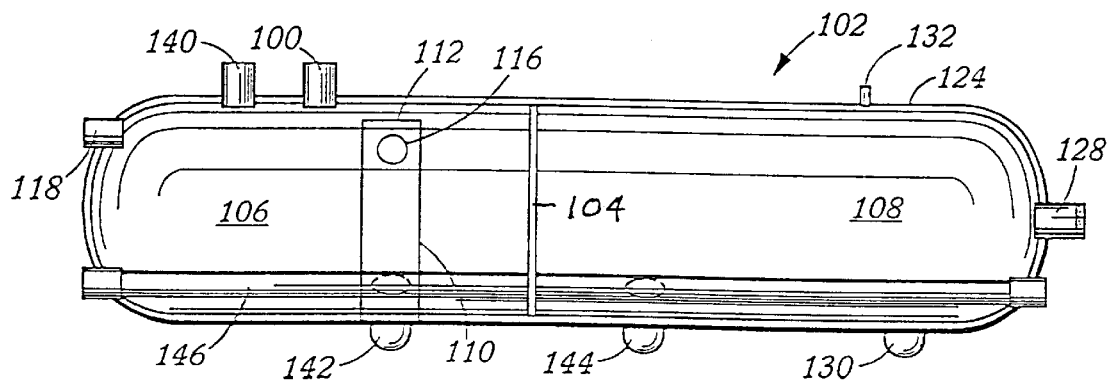
FIG. 3 is a schematic elevational view similar to FIG. 2 with parts removed.
Figure 4:
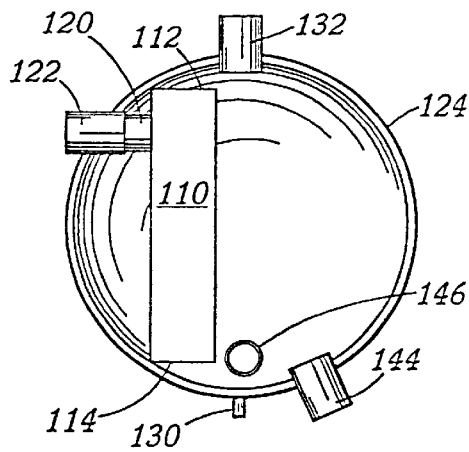
FIG. 4 is a schematic end elevational view of parts of FIG. 3.
Figure 5:
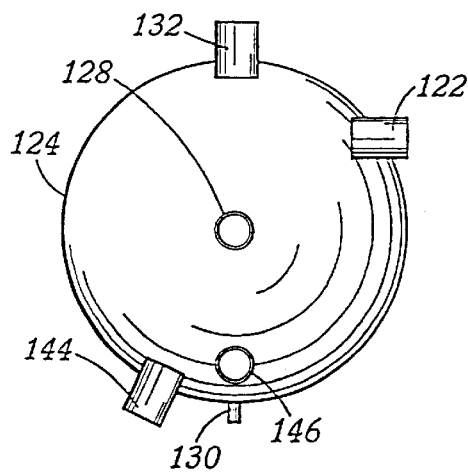
FIG. 5 is a schematic end elevational view taken from the right side of FIG. 2.

The absorber 2 has a level control apparatus 70, the emissions separator apparatus 16 has two level control apparatus 72 and 74 and the liquid water separator and removal apparatus 50 has a level control apparatus 76. Each of the level control apparatus 70, 72, 74 and 76 emit a gas during operation and are of the type marketed by Wellmark Company or Kimray under the trade designation liquid level control. The emitted gases are collected from each level control apparatus and are fed through inlet port 140 into the chamber 106 (FIG. 3) of the liquid water separator and removal apparatus 102, illustrated as 50 in FIG. 1. The gas from level control apparatus 70 is fed through conduit 78; the gas from level control apparatus 72 and 74 are fed through conduit 80 and the gas from level control apparatus 76 is fed through conduit 82 to the inlet port 140. Eventually, these gases flow with the wet glycol from the eductor 52 into and then from the three phase emissions separator apparatus 16 through conduit 21 to the system 22 to be used as fuel for the burner 68.

The water removing system is illustrated in FIGS. 2–5. The cooling of the effluent in the effluent condenser 42 changes the effluent from water vapor to liquid water and hydrocarbon vapors to liquid hydrocarbons and some uncondensed vapors. The uncondensed vapors, the liquid water and liquid hydrocarbons flow under a slight vacuum in the liquid water separator and removal apparatus 50 (2 to 3 inches water column) from the effluent condenser 42 through conduit 60 to the inlet 100 of the liquid water separator and removal apparatus 102 (the same as 50 in FIG. 1). The liquid water separator and removal apparatus 102 lies generally in a horizontal plane and has a generally cylindrical interior and has a sealed baffle 104 to divide the liquid water separator and removal apparatus 102 into two chambers 106 and 108. The chamber 106 has a generally vertically extending pipe 110 which is open at the top 112 and bottom 114. The pipe 110 has an open port 116 located approximately one inch below the outlet 118 of the liquid water separator and removal apparatus 102. Open port 116 is connected by pipe 120 to outlet pipe 122 in the shell 124 of the liquid water separator and removal apparatus 102. The chamber 108 has an inlet port 126, a liquid water control connection 128, a liquid water outlet port 130 and a pressure supply port 132.

The effluent from the effluent condenser 42 enters into the chamber 106 at the same absolute pressure as leaving the effluent condenser 42. The liquid hydrocarbons, gaseous hydrocarbons, uncondensed water vapor and any unseparated liquid water flow out of the chamber 106 through outlet 118 and through line 64 (FIG. 1) to the vacuum port 134 of the eductor 52 where they are entrained and compressed into the wet glycol flowing through the eductor 52. As described above, it is desirable to condense practically all of the vaporized water in the effluent from the still column in the effluent condenser apparatus. The liquid water and the liquid hydrocarbons obtained from the effluent are collected in the chamber 106 and are separated by gravity. The liquid hydrocarbons rise to the top and exit through outlet 118 and flow with the gaseous components to the vacuum port 134 of the eductor 52. The liquid water settles to the bottom and flows under the bottom 114 of the pipe 110 and up through the pipe 110. The liquid water then flows through pipe 120 to the outlet pipe 122. A conduit 136 (FIG. 2) having a normally open motor valve (not shown) mounted therein connects outlet pipe 122 to the inlet port 126. The liquid water flows from outlet pipe 122 through conduit 136 and into the chamber 108 through the inlet port 126. The chamber 108 has the same vacuum as the chamber 106. When the water level in the chamber 108 reaches a predetermined high level set point, the level control apparatus (not shown) but inserted through the connection 128 puts out a gas signal to open a water dump valve (not shown) and to close the normally open motor valve (not shown) in the conduit 136. The gas signal also energizes pressure supply port 132 to pressurize chamber 108 to above atmospheric pressure and cause the liquid water to flow out of the chamber 108 through liquid water outlet port 130 and the now opened motor valve (not shown). When the liquid water level in the chamber 108 reaches a predetermined low level, the level control apparatus vents off the pressure, opens the motor valve in the conduit 136 and closes the water dump valve. When the motor valve in the conduit 136 opens, the gas under pressure flows through the inlet 126 through the conduit 136 and outlet pipe 122 and out through the top 112 of pipe 110 into the chamber 106 and is withdrawn from the chamber 106 by the vacuum of the eductor 52 so that the vacuum pressure is equalized in the chambers 106 and 108. The liquid water then again begins to flow into the chamber 108. The liquid water separator and removal apparatus 102 is provided with a drain port 142 for the chamber 106 and a drain port 144 for the chamber 108. Also, heating apparatus 146 is provided in the liquid water separator and removal apparatus 102.

Figure 6:
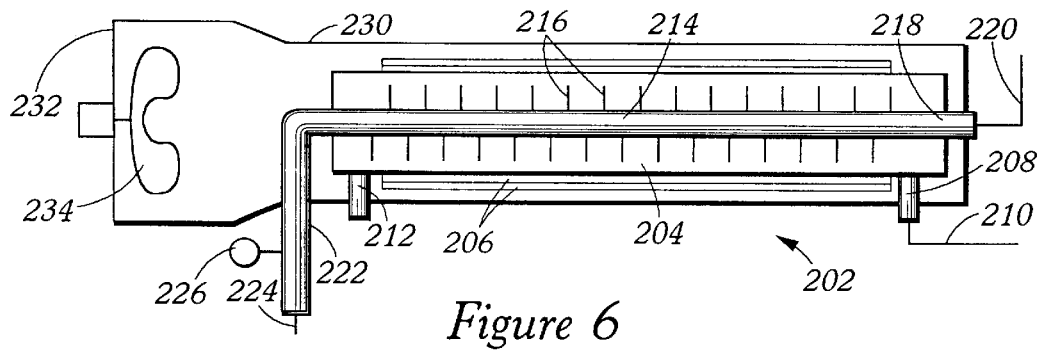
FIG. 6 is a schematic elevational view of another embodiment of an effluent condenser of this invention.

In FIG. 6, there is illustrated a preferred embodiment of the effluent condenser 42. This effluent condenser 202 has a hollow shell 204 having longitudinal fins 206 formed thereon which fins are formed from a material having a high coefficient of thermal conductivity. The hollow shell 204 has an inlet 208 for receiving circulating wet glycol from piping 210 similar to piping 44 in FIG. 1. After passing through the hollow shell 204, the circulating wet glycol exits through outlet 212. An elongated tube 214 extends through the hollow shell 204 and is in sealed relationship therewith. The elongated tube 214 is also provided with a fin 216 formed thereon which fin 216 is preferably spiralled and formed from a material having a high coefficient of thermal conductivity. If desired, the fin 216 could be a plurality of longitudinally extending fins. The elongated tube 214 has an inlet 218 for receiving effluent from the still column 30 through piping 220 which is similar to piping 46 of FIG. 1. As the effluent pass through the elongated tube 214, they are cooled and condensed into at least liquid water, liquid hydrocarbons and uncondensed vapors containing at least gaseous hydrocarbons which exit through outlet 222 into piping 224. A thermostat 226 is located in the outlet 222 to sense the temperature of the at least liquid water, liquid hydrocarbons and uncondensed vapors leaving the effluent condenser 202 for purposes described below. The temperature of the liquid water, liquid hydrocarbons and uncondensed vapors flowing out of the effluent condenser 202 is preferably between about 100° and 120° F.

In another embodiment of the invention, also illustrated in FIG. 6, an open ended hollow housing 230 surrounds the effluent condenser 202 and is spaced from the fins 206. The hollow housing 230 has an enlarged portion 232 in which there is mounted a fan 234. If the temperature of the liquid water, liquid hydrocarbons and uncondensed vapors passing through the outlet 222 is greater than about 140° F., the thermostat 226 functions to turn on the fan 234 to provide a forced draft over the hollow shell 204 to provide additional cooling in the effluent condenser 202. The fan 234 functions to provide a sufficient cooling effect until the temperature in the thermostat reaches about 120° F. or less at which temperature, the fan 234 is turned off.

Figure 7:
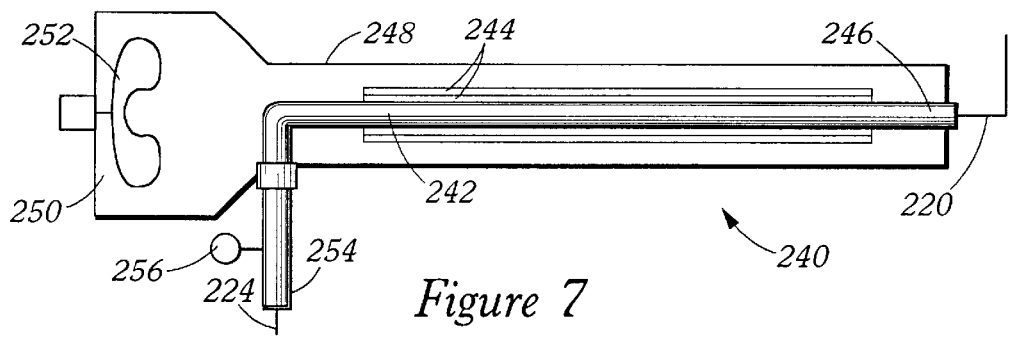
FIG. 7 is a schematic elevational view of yet another embodiment of an effluent condenser of this invention.

In FIG. 7, there is illustrated another embodiment of the effluent condenser 42. This effluent condenser 240 comprises an elongated tube 242 provided with a plurality of longitudinal fins 244 formed thereon which fins 244 are formed from a material having a high coefficient of thermal conductivity. The elongated tube 242 has an inlet 246 connected to the piping 220 to receive the effluent from the still column 30 of FIG. 1. An open ended hollow housing 248 surrounds the elongated tube 242 and is spaced from the fins 244. The open ended hollow housing 248 has an enlarged portion 250 in which there is mounted a fan 252. As described above, as the effluent from the still column 30 passes through the elongated tube 242, the effluent is cooled to produce at least liquid water, liquid hydrocarbons and uncondensed vapors which exit the elongated tube 242 through outlet 254 and into piping 224. A thermostat 256 is located in the outlet 254 and measures the temperature of the at least liquid water, liquid hydrocarbons and uncondensed vapors flowing through the outlet 254. If the temperature of the at least liquid water, liquid hydrocarbons and uncondensed vapors flowing through the outlet 254 is greater than 140° F., the thermostat 256 functions to turn on the fan 252 to provide a forced draft over the elongated tube 242 and the fins 244. The fan 252 functions to provide a sufficient cooling effect until the temperature in the thermostat 256 reaches about 120° F. or less at which temperature the fan is turned off.

Figure 8:
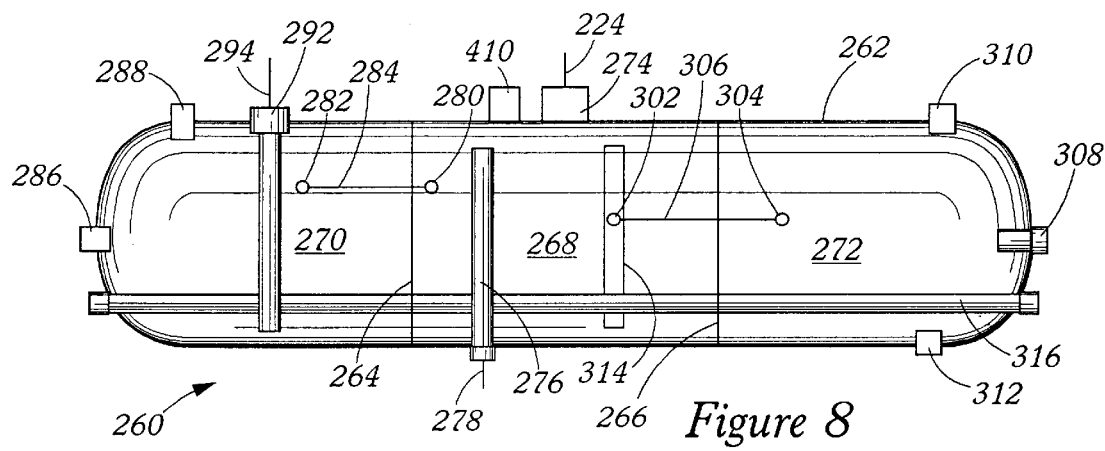
FIG. 8 is a schematic elevational view of another embodiment of a gas and liquid separator and removal apparatus of this invention.
Figure 9:
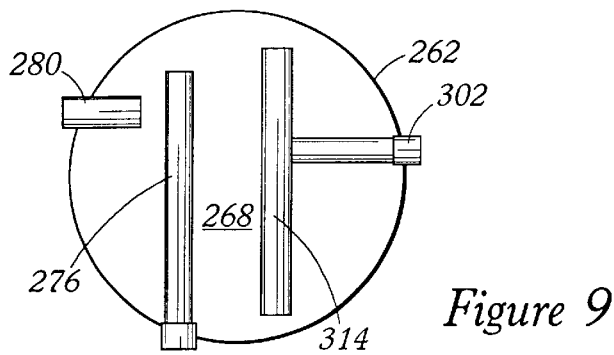
FIG. 9 is a schematic cross-sectional illustration of a portion of FIG. 8.

In FIGS. 8 and 9, there is illustrated another embodiment of the second separator identified in FIGS. 2–5 as the liquid water separator and removal apparatus 102. This second separator 260 comprises a closed hollow shell 262 having spaced apart sealed baffles 264 and 266 to divide the closed hollow shell 262 into three separate chambers 268, 270 and 272. The second separator has an inlet port 274 connected to the piping 224 to receive the liquid water, the liquid hydrocarbons and the uncondensed vapors from the effluent condenser into chamber 268 where they are separated into a lower portion of liquid water, an intermediate portion of liquid hydrocarbons and an upper portion of uncondensed vapors. A pipe 276 is mounted in chamber 268 and has an upper open end located in the upper portion having the uncondensed vapors. The lower end of the pipe 276 is connected to piping 278 connected to the vacuum port of an eductor (described more fully below). The uncondensed vapors are drawn from the upper portion through the pipe 276 by the vacuum in the eductor (described more fully below).

The liquid hydrocarbons are removed from the chamber 268 by suitable conventional apparatus such as that described above for removing the liquid water from the liquid water separator and removal apparatus 102 described above. An outlet port 280 projects outwardly from the chamber 268 through the closed hollow shell 262. As illustrated in FIG. 9, the outlet port 280 is located below the upper open end of pipe 276. An inlet port 282 in FIG. 8 extends through the closed hollow shell 262 and has an opening into the chamber 270. A conduit 284 having a normally open motor valve (not shown) therein connects the outlet port 280 with the inlet port 282. The liquid hydrocarbons flow through outlet port 280, conduit 284 and into chamber 270 through the inlet port 282. The chamber 270 has the same vacuum as the chamber 268. When the level of the liquid hydrocarbons reaches a predetermined high level set point, the level control apparatus (not shown) but inserted through the connection 286 puts out a signal to open a liquid hydrocarbon dump valve (not shown) and to close the normally open motor valve in the conduit 284. The signal also energizes gas pressure supply port 288 to pressurize chamber 270 to above atmospheric pressure and cause the liquid hydrocarbons to flow out of the chamber 270 through pipe 292 mounted in the chamber 270 and having a lower inlet opening and an outlet port 294 connected to piping 292 leading to a liquid hydrocarbon storage tank (not shown). When the liquid hydrocarbons in the chamber 270 reach a predetermined low level, the level control apparatus vents off the pressure, opens motor control valve (not shown) in the conduit 284 and closes the liquid hydrocarbon dump valve. When the motor valve in the conduit 284 opens, gas under pressure flows through the inlet port 282, conduit 284 and outlet port 280 into the chamber 268 and is withdrawn from the chamber 268 with the uncondensed vapors through the pipe 276.

The liquid water is removed from the chamber 268 by suitable apparatus such as that described above for removing the liquid water from the liquid water separator and removal apparatus 102. An outlet port 302 in the open ended pipe 314 projects outwardly from the chamber 268 through the closed hollow shell 262. As illustrated in FIG. 9, the outlet port 302 is located below the outlet port 280. An inlet port 304 extends through the closed hollow shell 262 and has an opening into the chamber 272. A conduit 306 having a normally open motor valve (not shown) therein connects the outlet port 302 with the inlet port 304. The liquid water flows through the lower open end of pipe 314 to the outlet port 302, conduit 306 and into chamber 272 through the inlet port 304. The chamber 272 has the same vacuum as the chamber 268. When the level of the liquid water reaches a predetermined high level set point, the level control apparatus (not shown) but inserted through the connection 308 puts out a signal to open a normally closed liquid water dump valve (not shown) and to close the normally open motor valve in the conduit 306. The signal also energizes gas pressure supply port 310 to pressurize chamber 272 to above atmospheric pressure and cause the liquid water to flow out of the chamber 272 through outlet 312 and the now opened liquid water dump valve mounted in the chamber 272 to a liquid water storage tank (not shown). When the liquid water in the chamber 272 reaches a predetermined low level, the level control apparatus vents off the pressure, opens motor control valve in the conduit 306 and closes the liquid water dump valve. When the motor valve in the conduit 306 opens, gas under pressure flows through the inlet port 304, conduit 306 and outlet port 302 and out through the top of pipe 314 into the chamber 268 and is withdrawn from the chamber 268 with the uncondensed vapors through the pipe 276. Also, the bottom of pipe 314 is open so that liquid water in the chamber 268 flows upwardly through the pipe 314 and then out through the outlet port 302. The second separator 260 also has a heated coil 316 for purposes described below. The heated coil 316 is illustrated as passing through the second separator 260 in a straight path but the heated coil 316 could be U-shaped and makes the turn in chamber 268 and then back through chamber 272.

Figure 10:
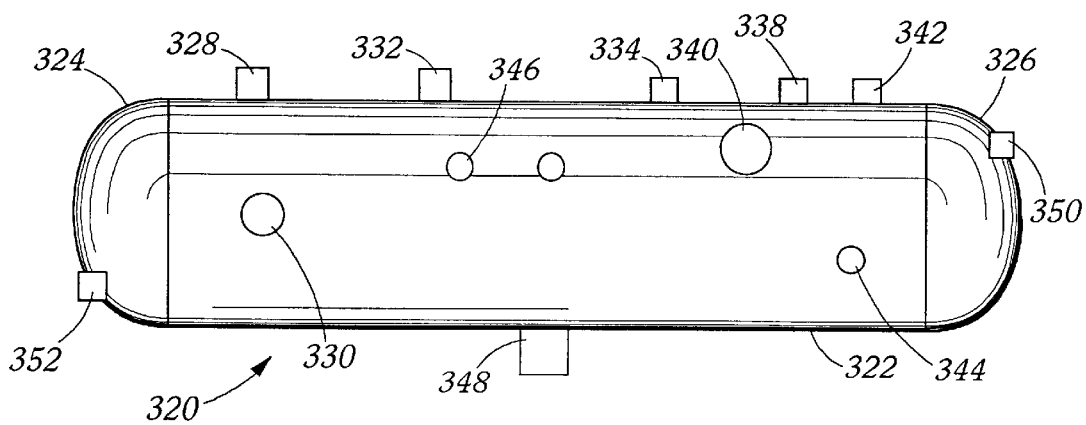
FIG. 10 is a schematic elevational view of a two phase emission separator of this invention.

In FIG. 10, there is illustrated another embodiment of the invention wherein the first separator comprises a two phase emissions separator apparatus 320 which is used instead of the three phase emissions separator apparatus 16 of FIG. 1. The emissions separator apparatus 320 comprises a generally cylindrical shell 322 closed at each end 324 and 326 to form a pressure tight vessel which operates at about 15 PSIG. A plurality of inlet and outlet ports project outwardly from the cylindrical shell 322. The locations of the various ports in the drawing and the following description are for illustration purposes only and may be at different locations in an actual apparatus. As described below, the emissions separator apparatus 320 has the capacity to hold the wet glycol received from the absorber 2 of FIG. 1 and the wet glycol that is circulated through the rest of the system and an additional amount of wet glycol. The wet glycol from the absorber 2 of FIG. 1 flows through piping and enters the emissions separator apparatus 320 through inlet port 328. The circulating wet glycol and the uncondensed vapors from an eductor, described below, enter the emissions separator apparatus 320 through inlet port 330. In a circulating system wherein portions of the wet glycol are passed through a particulate filter, such wet glycol enters the emissions separator apparatus 320 through inlet port 332. Port 334 is provided for mounting a valve (not shown) to dump wet glycol from the emissions separator apparatus 320 to the coil 27 in the dry glycol storage 28 which receives and holds the hot dry glycol from the reboiler 24 as described above. A pressure relief valve (not shown) is mounted at port 338. Liquid level control apparatus (not shown) passes through a sealed opening 340. Gauge glasses are mounted in sealed openings 342 and 344. A thermometer (not shown) is installed through sealed opening 346. The circulating wet glycol passes through outlet port 348 to a circulating pump as described below. A gas dryer (not shown) is mounted through sealed opening 350 in end 326. An immersion type electric heater (not shown) is installed through sealed opening 352 in end cap 324 for purposes described below.

Figure 11:
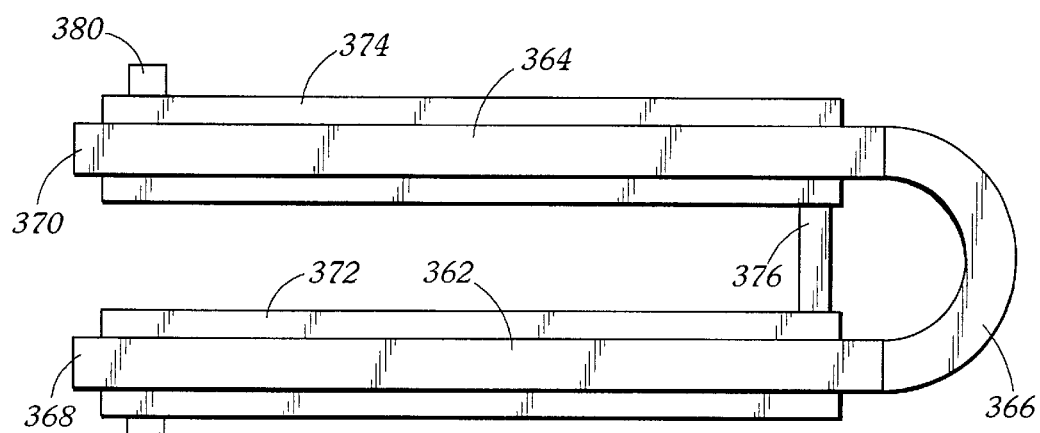
FIG. 11 is a schematic elevational view of a wet glycol heat exchanger of this invention.
Figure 12:
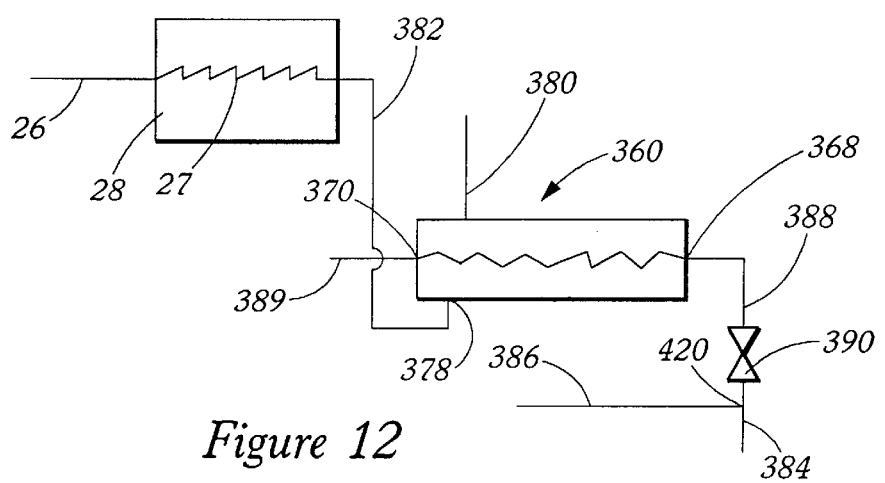
FIG. 12 is a block diagram of the operation of a wet glycol heat exchanger of FIG. 11.

In FIG. 11, there is illustrated a wet glycol heat exchanger 360 which is used in the system illustrated by the block diagrams in FIG. 12. The heat exchanger 360 is used to provide an increase in temperature to the wet glycol being circulated in the system including the emissions separator, the eductor and the liquid separator and removal apparatus. The heat exchanger 360 comprises finned tubes 362 and 364 open at both ends. The finned tubes 362 and 364 are joined together by a 180 degree return bend 366 so as to form a U-shaped structure. The tube 362 has an inlet portion 368 which may receive at least part or all of the wet glycol being circulated, as described below, and an outlet portion 370 through which the heated wet glycol flows. The finned tubes 362 and 364 are encased within tubes 372 and 374 which are closed at both ends around tubes 362 and 364 to form pressure tight shells and are connected together by hollow tube 376. Hot wet glycol from a heat exchanger, such as the coil 27 of the dry glycol storage 28 of FIG. 1, enters the tube 372 through inlet port 378 and flows through hollow tube 376 into tube 374 to heat the wet glycol passing through tubes 362 and 364. The hot wet glycol in the tube 374 exits through outlet port 380 and moves through suitable piping to enter the still column 30 of FIG. 1.

The operation of the heat exchanger 360 of FIG. 11 is explained in relationship to the block diagram in FIG. 12. Referring to FIG. 1, hot dry glycol is received in storage tank 28 from the reboiler 24. A coil 27 is mounted in the storage tank 28 and receives wet glycol from either the emissions separator apparatus 16 of FIG. 1 or the emissions separator apparatus 320 of FIG. 10 through pipe 26. The wet glycol passes through the coil 27 so that the temperature thereof is increased and exits therefrom and flows through pipe 382 to inlet port 378, passes over the tubes 362 and 364 in the heat exchanger 360 and exits through outlet port 380 into pipe 29 of FIG. 1 leading to the still column 30. As illustrated in FIG. 12, the wet glycol in line 384 from the emissions separator apparatus 320 either bypasses the heat exchanger 360 through line 386 or flows through the heat exchanger 360 through line 388. As explained more fully below, a control valve 390 is controlled by a thermostat 392 associated with the emissions separator apparatus 320 to control the amount of wet glycol flowing through the heat exchanger 360.

Figure 13:
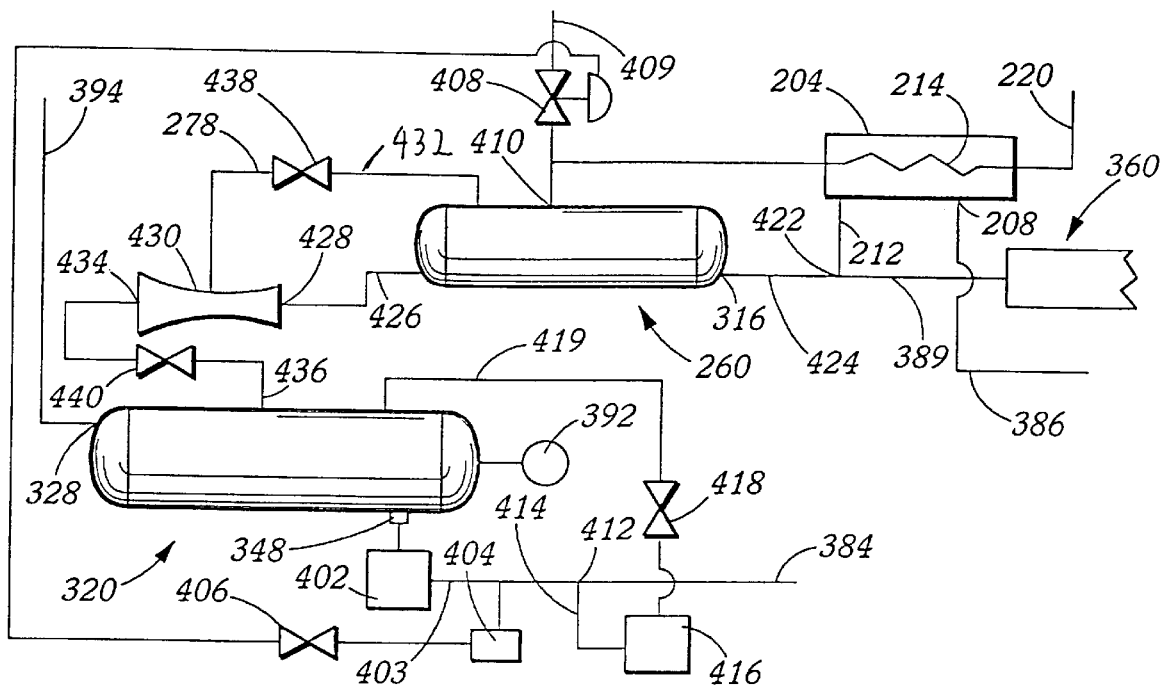
FIG. 13 is a block diagram illustrating the operation of this invention using the effluent condenser of FIG. 6.

The operation of a gas dehydrator using the effluent condenser 202 of FIG. 6 is illustrated in FIG. 13. Wet glycol from the absorber 2 of FIG. 1 flows through pipe 394 to the inlet port 328 of the two phase emissions separator apparatus 320. The wet glycol is collected in the two phase emissions separator apparatus 320 as described above so that there is a predetermined amount of wet glycol to be circulated and an additional amount of wet glycol that is passed through the system to remove the water therefrom. Suitable liquid level control apparatus passes through a sealed opening in the two phase emissions separator apparatus 320 to control the level of the wet glycol in the two phase emissions separator apparatus 320.

Figure 14:
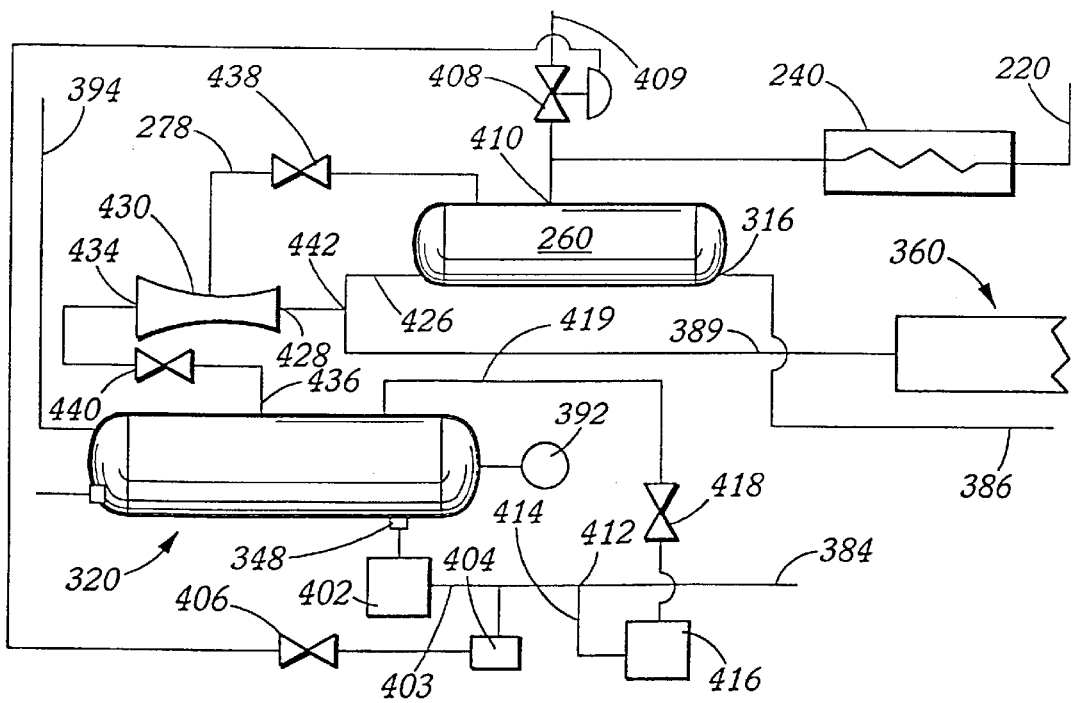
FIG. 14 is a block diagram illustrating the operation of this invention using the effluent condenser of FIG. 7.

The effluent from the still column 30 of FIG. 1 flows through piping 220 into the finned tube 214 in the effluent condenser 202. The circulating wet glycol, as described above, is withdrawn from the emissions separator apparatus 320 as shown in FIGS. 13 and 14 through outlet 348 and enters a pump 402 which circulates the wet glycol either through a particulate filter 416 or transmission line 384 or both as described below.

The wet glycol for circulation through the system is withdrawn from the emissions separator apparatus 320 through outlet 348 and enters into a pump 402 which feeds the wet glycol into the line 403 at the rate of about 20 gallons per minute and at a pressure of between about 50–115 PSIG. A normally closed switch 404 is provided in the line 403 to sense the pressure of the wet glycol leaving the pump 402. A loss of pressure in the line 403 would potentially decrease the vacuum being pulled by the eductor (described below) which could cause an over pressure condition in the reboiler 24 of FIG. 1. If the pressure in the line 403 falls below 40 PSIG, switch 404 opens. The opening of switch 404 deactivates electric solenoid valve 406 which opens normally closed motor valve 408 located upstream of the inlet port 410 on the liquid separator and removal apparatus 260. The opening of motor valve 408 vents the liquid separator and removal apparatus 260 to atmosphere through line 409 to prevent any build up of pressure in the reboiler 24.

The pump 402 feeds wet glycol into line 403 at the rate of at least 20 gallons per minute and a pressure of at least about 50 PSIG to provide a sufficient flow of wet glycol through the eductor 430 (described below) and to provide side stream filtration of any wet glycol not required to power eductor 430. At point 412, line 403 is divided into line 384 and a side stream line 414 which carries any circulating wet glycol to a particulate filter 416. A manually adjustable valve 418 controls the flow of the wet glycol through the particulate filter 416 so that cleaned wet glycol flows back into the emissions separator apparatus 320 through line 419. A valve (not shown) in the line 414 permits the closing of line 414 so that the particulate filter 416 may be changed as necessary. The pump 402 and the adjustable valve 418 ensure that sufficient wet glycol is being circulated in line 384 to operate the eductor 430 so that only excess circulating wet glycol flows through the particulate filter 416.

The wet glycol, circulated through the system of this invention as illustrated in FIGS. 12 and 13, preferably is at a temperature of between about 80°–120° F. At point 420 in FIG. 12, line 384 carrying the wet glycol is split to provide for the flow of the wet glycol from line 384 into either line 386 or 388. The motor valve 390, operated in response to the thermostat 392, controls the flow of the wet glycol into either line 386 or 388. When the temperature of the wet glycol flowing through line 384 decreases to about 90° F., the thermostat 392 gradually opens motor valve 390 so that some of the wet glycol flows through line 388 and enters the inlet port 368 of the heat exchanger 360 in an amount dependent on the opening of the valve 390. As the wet glycol passes through the heat exchanger 360, the temperature of the wet glycol is increased and exits into line 389. The rest of the wet glycol from line 384 flows through line 386 to the inlet port 208 of the hollow shell 204 to cool the effluent in the elongated tube 214 and then leaves through the outlet port 212. At point 422, the wet glycol from outlet port 212 joins any heated wet glycol in the line 389 and flows through line 424 into the heated coil 316 in the liquid water separator and removal apparatus 260. If the thermostat 392 would fully open motor valve 390, substantially no wet glycol would flow through line 386 to the hollow shell 204. Since inlet port 208 is at a higher elevation than the inlet portion of the heated coil 316, a hydrostatic head of glycol is created between the inlet port 208 and the inlet portion of the heated coil 316. Therefore, the wet glycol required by the eductor 430 (described below) will preferentially flow through line 388 into the heat exchanger 360.

The circulating wet glycol leaving the heated coil 316 flows through line 426 to the inlet port 428 of the eductor 430. As the circulating wet glycol passes through the eductor 430, it creates a vacuum which draws the separated uncondensed vapors, including gaseous hydrocarbons, from the chamber 268 of the liquid separator and removal apparatus 260 through piping 278. The eductor 430 also compresses the uncondensed vapors and entrains them with the wet glycol flowing through the eductor 430 which then leave through outlet port 434 and flow under pressure of about 15 PSIG through line 436 into the emissions separator apparatus 320. Check valve 438 in line 432 and check valve 440 in line 432 function to prevent the pressure in the emissions separator apparatus 320 from back flowing into the above-described vacuum system. The volume of the circulating wet glycol required to power the eductor 30 is a function of the size of the eductor 430. For a smaller dehydrator, a one inch eductor is used and requires a circulating wet glycol volume of approximately 10 gallons per minute.

The operation of the dehydrator using the effluent condenser 240 of FIG. 7 is illustrated in FIG. 14. As explained above, the primary difference between effluent condenser 240 and effluent condenser 202 is that no wet glycol is passed through effluent condenser 240. As described above, the wet glycol in line 384 reaches the point 420 in FIG. 12. When the motor valve 390 is substantially or completely closed, most or all of the wet glycol flows through line 386 to the heating coil 316 in the liquid water separator and removal apparatus 260. If the motor valve 390 is half-way or completely opened by the thermostat 392, most or all of the wet glycol flows through line 388, the heat exchanger 360 and line 389 until it reaches point 442 where it is combined with any wet glycol flowing from the heated coil 316 in the liquid water separator and removal apparatus 260 to flow through line 426 into the eductor 430. Since the inlet of the heated coil 316 in the liquid water separator and removal apparatus 260 is at a higher elevation than the inlet port 428 of the eductor 430, a hydrostatic head of wet glycol is created between the inlet of the heated coil 316 and the inlet port 428 of the eductor 430. Therefore, any time the motor valve 390 is opened by the thermostat 392, the circulating wet glycol will preferentially flow through the heat exchanger 360 into line 389. Instead of the valve 390, a conventional three way valve may be used to control the flow of the circulating wet glycol.

Under most conditions, the heat exchanger 360 will provide enough heat to keep the wet glycol in the emissions separator apparatus 320 at desired operating temperatures. If necessary, a conventional electric immersion heater may be inserted into the emissions separator apparatus 320 through opening 352.

Figure 15:
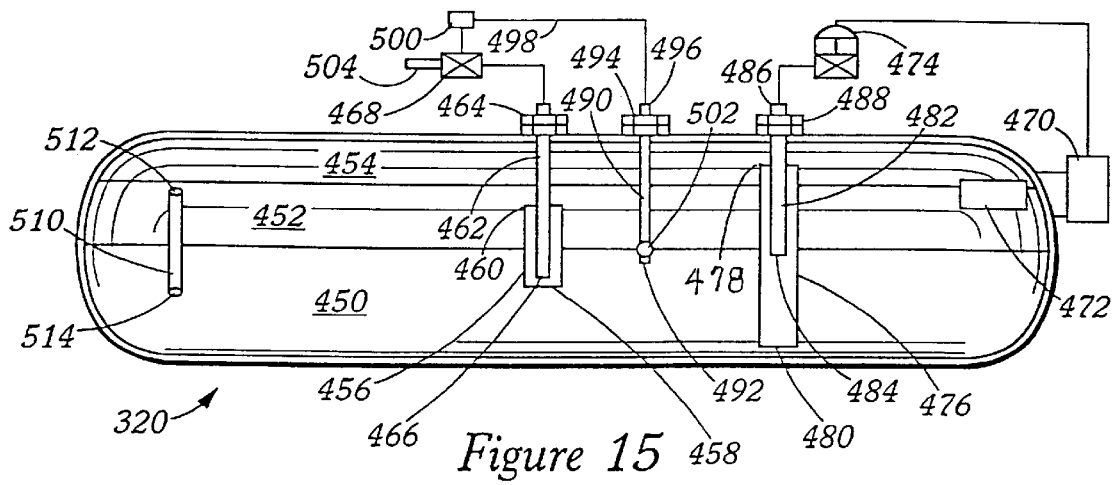
FIG. 15 is a schematic side elevational view of apparatus for controlling the amount of liquid hydrocarbons in the system just as the liquid hydrocarbons are to be dumped.

In FIG. 15, there is illustrated apparatus for preventing an undesirable build up of a liquid hydrocarbon level in a two phase emissions separator apparatus 320 which has located therein a lower liquid level 450 of wet glycol; an intermediate liquid level 452 of liquid hydrocarbons and an upper level 454 of hydrocarbon gases. A casing 456 is mounted in the two phase emissions separator 320 and has a lower closed end 458 that is located to be in the lower liquid level 450 of wet glycol and an upper open end 460 that is located in the intermediate liquid level 452 of liquid hydrocarbons. A vertical pipe 462 is mounted through a threaded plug 464 in the two phase emissions separator apparatus 320 so that a lower open end 466 is located within the casing 456 at a location adjacent to but spaced from the lower closed end 458 between about 0.75 and 1.25 inches and preferably about 1.00 inch. The upper open end of the vertical pipe 462 is connected to a solenoid valve 468 for purposes described below. A choke nipple (not shown) on the outlet side of the solenoid valve preferably controls the volume of liquid hydrocarbons to be dumped to between about 1.25 and 0.50 gallon per minute and preferably about 1.0 gallon per minute.

A conventional throttling liquid level control apparatus 470 has a displacer 472, sometimes referred to as a float, mounted in the emissions separator apparatus 320 to sense the level of the liquids in the emissions separator apparatus 320. The throttling liquid level control apparatus 470 functions to regulate dump valve 474 which feeds wet glycol to the still column 30 of the reboiler 24. Only a very small almost microscopic movement of the displacer 472 is required to signal the liquid level control apparatus 470 to open or close dump valve 474. The volume of wet glycol 450 in the emissions separator apparatus 320 is greater than the amount of wet glycol to be sent to the reboiler 24 and the amount of wet glycol being circulated by the pump 36. In normal operation, the wet glycol from the absorber 2 is fed into the wet glycol in the emissions separator apparatus 320 and the liquid control apparatus 470 functions to send substantially the same amount of wet glycol to the still column 30 of the reboiler 24.

An open ended tube 476 is mounted in the emissions separator apparatus 320 so that the upper open end 478 is located above the level of the liquids in the emissions separator apparatus 320 as controlled by the throttling liquid level control apparatus 470 and is exposed to the hydrocarbon gases 454. The lower open end 480 is located adjacent to but spaced from the bottom of the emissions separator apparatus 320 which space, in one embodiment of the invention, preferably is about one inch. An open ended pipe 482 is mounted in the emissions separator apparatus 320 so that the lower portion of the open ended pipe 482 is located within the open ended tube 476. The lower open end 484 determines the minimum level of wet glycol in the emissions separator apparatus 320. The upper open end 486 extends through a port 488 in the emissions separator apparatus 320 and is connected to the dump valve 474 so that the wet glycol 450 in the emissions separator apparatus 320 flows through the lower open end 480, enters the lower open end 484 and flows through the dump valve 474 to the still column 30 of the reboiler 24.

Figure 16:
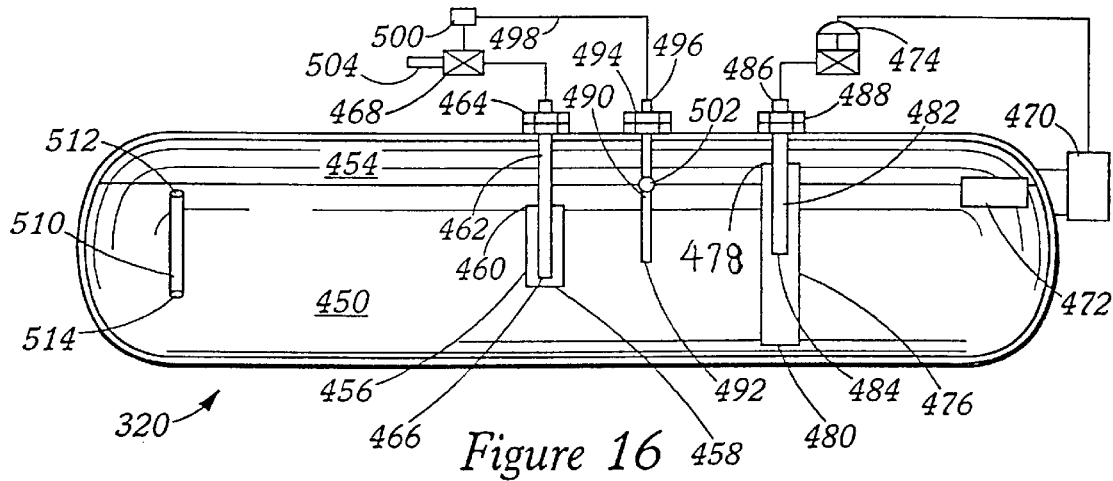
FIG. 16 is similar to FIG. 15 but shows the emissions separator apparatus when containing no liquid hydrocarbons.
Figure 17:
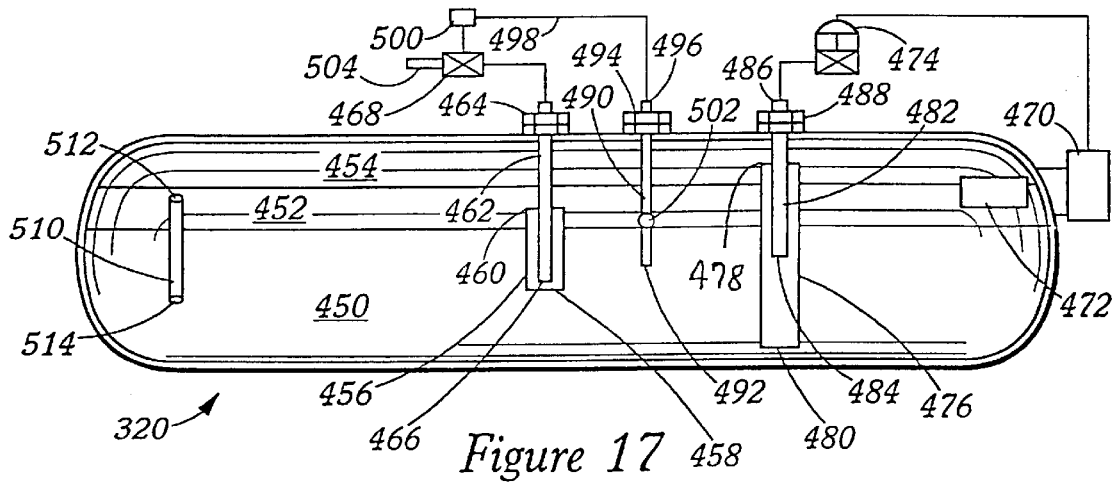
FIG. 17 is similar to FIG. 15 but shows the apparatus after at least some of the liquid hydrocarbons have been dumped.

The apparatus for controlling the dumping of liquid hydrocarbons 452 from the emissions separator apparatus 320 is illustrated in FIGS. 15–17. A hollow tube 490 having a closed end 492 is mounted in the emissions separator apparatus 320 so that the closed end 492 is located in the wet glycol 450 in the emissions separator apparatus. A reed switch (not shown) is located adjacent to but spaced from the closed end 492 for a purpose described below. The upper end 494 of the hollow tube 490 passes through a port 496. A wire 498 has one end connected to the reed switch (not shown) and its other end connected to a control box 500 for operating the solenoid valve 468. A float 502, weighted to float on the wet glycol 450 in the emissions separator apparatus 320, is mounted for sliding movement over the tube 490. The float 502 has magnetic apparatus (not shown) mounted therein to operate the reed switch in the hollow tube 490 as described below.

The operation of the apparatus for the dumping of the liquid hydrocarbons 452 from the emissions separator apparatus 320 is illustrated in FIGS. 15–16. The commencement of the operation of the apparatus is illustrated in FIG. 16. The wet glycol 450 in the emissions separator apparatus 320 is at its highest level and there are no liquid hydrocarbons 452 in the emissions separator apparatus 320. The throttling liquid level control apparatus 470 has opened dump valve 474 so that, as wet glycol from the absorber 2 enters the emissions separator apparatus 320, a similar amount of wet glycol is dumped through the dump valve 474. As the apparatus continues to operate small amounts of liquid hydrocarbons 452 will be deposited in the emissions separator apparatus 320. The liquid hydrocarbons 452 can result from those in the wet glycol coming from the absorber, from those coming with the wet glycol from the eductor and those condensed from the gaseous hydrocarbons 454 in the emissions separator apparatus.

Over a period of time, which may be months or a year or longer, the build up of the liquid hydrocarbons 452 will continue until they reach the level illustrated in FIG. 15. The float 502 floating on the top of the wet glycol 450 in the emissions separator apparatus 320 has moved downwardly, as illustrated in FIG. 15, to a position to trip the reed switch in the hollow tube 490 to send a signal to open solenoid valve 468 so that liquid hydrocarbons 452 will begin to flow through pipe 462 out of the emissions separator apparatus 320. The rate of flow of the liquid hydrocarbons 452 is greater than the rate of flow of wet glycol from the absorber 2 into the emissions separator apparatus 320. Therefore, the level of the liquids in the emissions separator apparatus 320 will fall causing liquid level control apparatus 470 to close dump valve 474 so that no wet glycol 450 is being dumped to the reboiler 24. The liquid hydrocarbons 452 in the emissions separator apparatus 320 will be continued to be dumped through pipe 462 until sufficient wet glycol from the absorber 2 has raised the level of the wet glycol 450 in the emissions separator apparatus 320 a sufficient amount so that the float 502 will function to open the reed switch and close the solenoid valve 468. The throttling liquid level control apparatus 470 will continue to keep the dump valve 474 closed and will only open the dump valve 474 once the total level of the liquids, i.e., the liquid hydrocarbons 452 and the wet glycol 450, reach the level illustrated in FIGS. 16 and 17. If the level of the wet glycol 450 does not cause the float 502 to close the solenoid valve 468 until after the level of the liquid hydrocarbons 452 have reached the upper open end 460 only a small quantity of gaseous hydrocarbons will flow through the solenoid valve 468 until the level of the wet glycol 450 reaches the required level. As a safety measure, a second reed switch (not shown) may be located in the hollow tube 490 to ensure that the solenoid valve 468 is closed in the event of a failure of the first reed switch to close the solenoid valve. A pipe 504 connects the solenoid valve 468 to suitable collection apparatus for the storage of liquid hydrocarbons. If the liquid hydrocarbons 452 were not removed from the emissions separator apparatus 320, it is possible that the upper level of the wet glycol in the emissions separator apparatus 320 would fall below the lower open end 480 so that liquid hydrocarbons 452 would flow through pipe 482 and dump valve 474 to the reboiler 24 to possibly cause disastrous results. These results can also happen when the emissions separator apparatus has weir apparatus for the removal of the liquid hydrocarbons. It is noted that initially a small amount of the wet glycol will be collected in the casing 456 and will flow through the open solenoid valve 468.

A liquid gauge 510 is installed in the emissions separator apparatus 320 to show the level of the liquid hydrocarbons 452 in the emissions separator apparatus 320. One open end 512 is installed so that it is located below the top level of the liquids in the emissions separator apparatus 320. The lower open end 514 is located so that it will always be exposed to the wet glycol 450 in the emissions separator apparatus 452. The liquid gauge will contain a mark (not shown) indicating that the level of the wet glycol 450 should not be below such mark.

The preferred operation of the apparatus schematically illustrated in FIGS. 15–17 is as follows. In FIG. 16, there is illustrated the location of the various parts as the apparatus starts to operate. The float 502 is at the top of the wet glycol 450 in the emissions separator apparatus 320. The upper open end 460 is spaced a distance of between about 0.33 and 0.60 inch and preferably about 0.50 inch below the level of the wet glycol 450 as indicated by the float 502. This location of the upper open end 460 is a first predetermined level. The displacer 472 has signalled the liquid level control apparatus 470 to open dump valve 474 so that the amount of the wet glycol being transferred to the still column 30 is substantially equal to the amount of the wet glycol being received from the absorber 2 by the emissions separator apparatus.

As described above, liquid hydrocarbons 452 begin to be deposited in the emissions separator apparatus 320 until the depth of the liquid hydrocarbons 452 has reached between about 3.75 and 4.25 inches and preferable about 4.00 inches. As illustrated in FIG. 15, the float 502, which is floating on the top of the wet glycol 450, is now at a distance below the upper open end 460. This location of the float 502 is a second predetermined level. At this second predetermined level, the float 502 operates the reed switch (not shown) in the tube 490 to close a circuit to open solenoid valve 468 so that the dumping of the liquid hydrocarbons 452 from the emissions separator apparatus 320 commences. The dumping of the liquid hydrocarbons 452 from the emissions separator apparatus 320 is at a rate greater than the rate at which wet glycol is received from the absorber 2 so that the liquid level in the emissions separator apparatus 320 is being lowered. When the displacer 472 senses a change in the liquid level in the emissions separator apparatus 320, a third predetermined level, the displacer 472 signals the liquid level control apparatus 470 to close the dump valve 474 so that no wet glycol is being transferred to the still column 30. At this time, the wet glycol being received from the absorber 2 raises the level of wet glycol in the emissions separator apparatus 320. Therefore, the float 502 begins to move upwardly. When the float 502 reaches a level between the first and second predetermined levels, which level is a fourth predetermined level, the reed switch in the tube 490 is opened and the solenoid valve 468 is closed to stop the dumping of the liquid hydrocarbons 452. The level of the wet glycol continues to rise until it reaches the level indicated in FIG. 17. The liquid level in the emissions separator apparatus 320 continues to rise until it has reached a level at which the displacer 472 signals the liquid level control 470 to open dump valve 474 so that wet glycol is transferred to the still column 30 at substantially the same rate as the wet glycol is being received from the absorber 2.

The dimensions cited above may be varied depending on the size of the natural gas dehydrator.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. In apparatus for use with a natural gas dehydrator wherein a supply of natural gas is fed into an absorber wherein it is subjected to dry glycol to remove undesirable materials, including water, therefrom so that the dry glycol is changed into wet glycol that is removed from the absorber, the method comprising:

providing first separator apparatus containing a supply of wet glycol and located to receive wet glycol from said absorber;

transferring at least portions of said wet glycol in said first separator apparatus to a still column of a reboiler apparatus using a first transfer apparatus so that said transferred portions of said wet glycol can be changed to at least dry glycol and effluent;

transferring said effluent from said still column to condenser apparatus using a second transfer apparatus;

converting said effluent into at least liquids and uncondensed vapors in said condenser apparatus;

providing second separator apparatus;

transferring said liquids and said uncondensed vapors to said second separator apparatus using a third transfer apparatus;

circulating other portions of said wet glycol from said first separator apparatus in a circulatory path and returning said other portions of said wet glycol to said first separator apparatus;

separating at least said uncondensed vapors from said liquids in said second separator apparatus; and entraining and compressing said uncondensed vapors into said circulating other portions of said wet glycol to be returned therewith to said first separator apparatus.

2. A method as in claim 1 and further comprising:

producing a force by locating force producing apparatus having an inlet portion and an outlet portion in said circulatory path so that said other portions of said wet glycol pass through said force producing apparatus to produce said force;

using said force to transfer at least said uncondensed vapors from said second separator apparatus to said force producing apparatus using a fourth transfer apparatus; and entraining and compressing said at least said uncondensed vapors in said other portions of said wet glycol in said force producing apparatus and returning said entrained uncondensed vapors and said other portions of said wet glycol to said first separator apparatus.

3. A method as in claim 2 wherein said force is produced by a method comprising:

locating an educator having said inlet portion, said outlet portion and a vacuum portion in said circulatory path so that said other portions of said wet glycol pass through said educator to create a vacuum therein; and connecting at least a portion of said fourth transfer apparatus to said vacuum portion so that said vacuum draws at least said uncondensed vapors from said second separator apparatus so that said uncondensed vapors drawn into said educator are entrained and compressed into said other portions of said wet glycol.

4. A method as in claim 2 wherein said effluent is converted by a method comprising:

flowing said other portions of said wet glycol through a hollow shell located in said circulatory path; and passing said effluent through a tube in sealed engagement with and extending through said hollow shell so that said effluent is converted into liquid water, liquid hydrocarbons and uncondensed vapors.

5. A method as in claim 4 and further comprising:

dividing said circulatory path into a first path and a second path;

combining said first path and said second path back into said circulatory path;

locating heat exchanger apparatus in said first path so that any portion of said other portions of wet glycol in said first path passes through said heat exchanger apparatus;

raising the temperature of said any portion of said other portions of wet glycol as they pass through said heat exchanger apparatus;

controlling the flow of said other portions of wet glycol through either said first path or said second path;

passing said at least another portion of said other portions of said wet glycol in said second path through said condenser apparatus; and using a first thermostat apparatus to control the flow of any portion of said other portions of said wet glycol through either said first path or said second path or both.

6. A method as in claim 5 and further comprising:

surrounding said condenser apparatus with an open ended housing so that a circular space exists between said housing and said condenser apparatus;

flowing a cooling fluid through said space to cool further said effluent in said tube; and controlling the operation of said cooling fluid by second thermostat apparatus.

7. A method as in claim 2 wherein said effluent is converted by a method comprising:

flowing said other portions of said wet glycol flow through a hollow shell located in said circulatory path;

passing said effluent through a tube in sealed engagement with and extending through said hollow shell so that said effluent is converted into liquid water, liquid hydrocarbons and uncondensed vapors; and transferring said other portions of said wet glycol from said condenser apparatus to said force producing apparatus using fifth transfer apparatus extending between said condenser and said force producing apparatus.

8. A method as in claim 2 wherein said effluent is converted by a method comprising:

passing said effluent through an elongated tube having an inlet connected to said second transfer apparatus and an outlet connected to said third transfer apparatus;

surrounding said elongated tube with an open ended housing;

passing a fluid through said open ended housing to cool said effluent in said elongated tube; and controlling the operation of said passing a fluid through said open ended housing by first thermostat apparatus.

9. A method as in claim 8 and further comprising:

dividing said circulatory path into a first path and a second path;

combining said first path and said second path back into said circulatory path;

locating heat exchanger apparatus in said first path so that any portion of said other portions of said wet glycol in said first path passes through said heat exchanger apparatus;

raising the temperature of said at least part of said other portions of said wet glycol as they pass through said heat exchanger apparatus;

controlling the flow of said other portions of wet glycol through either said first path or said second path; and using second thermostat apparatus to control the flow of said other portions of said wet glycol through either said first path or said second path or both.

10. A method as in claim 2 wherein:

providing said reboiler with a still column;

transferring dry glycol from said reboiler to storage tank apparatus using heat exchanger apparatus; and passing said portion of said wet glycol in said first transfer apparatus through said heat exchanger apparatus to raise the temperature of said portions of wet glycol prior to the transfer thereof to said still column.

11. A method as in claim 2 wherein said first separator apparatus also contains therein gaseous hydrocarbons and liquid hydrocarbons so that the gaseous hydrocarbons are located in an upper portion thereof, the liquid hydrocarbons are located in an intermediate portion thereof and the wet glycol is located in a lower portion thereof which method further comprises:

sensing the level of said liquids in said first separator apparatus to control the amount of said wet glycol being transferred to said still column;

sensing the level of said wet glycol in said first separator apparatus;

locating dumping apparatus for dumping at least portions of the liquid hydrocarbons from said first separator apparatus so that an inlet portion of said dumping apparatus is at a first predetermined level in said first separator apparatus and wherein said dumping apparatus is normally in a closed position;

opening said dumping apparatus when said wet glycol in said first separator apparatus has reached a second predetermined level which is below said first predetermined level;

stopping the transfer of said wet glycol from said first separator apparatus to said still column when said level of said liquids in said first separator apparatus reaches a third predetermined level which is located above said first predetermined level; and closing said dumping apparatus when said level of said wet glycol in said first separator apparatus reaches a fourth predetermined level which is between said first and second predetermined levels.

12. A method as in claim 11 and further comprising:

restarting said transfer of said wet glycol from said first separator apparatus to said still column so that said level of said liquids in said first separator apparatus has returned to its original level.

13. In apparatus for use with a natural gas dehydrator wherein a supply of natural gas is fed into an absorber wherein it is subjected to dry glycol to remove undesirable materials, including water, therefrom so that the dry glycol is changed into wet glycol that is removed from the absorber and transferred to an emissions separator apparatus and at least a portion thereof is transferred to a still column and wherein over a period of time the emissions separator contains an upper portion of gaseous hydrocarbons, an intermediate portion of liquid hydrocarbons and a lower level of wet glycol, the method comprising:

sensing the level of said liquids in said emissions separator apparatus to control the amount of said wet glycol being transferred to said still column;

sensing the level of said wet glycol in said emissions separator apparatus;

locating dumping apparatus for dumping at least portions of the liquid hydrocarbons from said emissions separator apparatus so that an inlet portion of said dumping apparatus is at a first predetermined level in said emissions separator apparatus and wherein said dumping apparatus is normally in a closed position;

opening said dumping apparatus when said wet glycol in said emissions separator apparatus has reached a second predetermined level which is below said first predetermined level;

stopping the transfer of said wet glycol from said emissions separator apparatus to said still column when said level of said liquids in said emissions separator apparatus reaches a third predetermined level which is located above said first predetermined level; and closing said dumping apparatus when said level of said wet glycol in said emissions separator apparatus reaches a fourth predetermined level which is between said first and second predetermined levels.

14. Apparatus for use with a natural gas dehydrator wherein a supply of natural gas is fed into an absorber wherein it is subjected to dry glycol to remove undesirable materials, including water, therefrom so that the dry glycol is changed into wet glycol that is removed from the absorber comprising:

first separator apparatus containing at least a supply of wet glycol and located to receive wet glycol from said absorber;

reboiler apparatus having a still column for converting wet glycol to dry glycol and effluent;

first transfer apparatus for transferring at least portions of said wet glycol in said first separator apparatus to said still column of said reboiler apparatus;

second transfer apparatus for transferring said effluent from said reboiler to condenser apparatus;

said condenser apparatus converting said effluent into at least liquids and uncondensed vapors;

second separator apparatus;

third transfer apparatus for transferring said liquids and said uncondensed vapors to said second separator apparatus;

said second separator apparatus separating at least said uncondensed vapors from said liquids;

circulating apparatus for removing other portions of said wet glycol from said first separator apparatus, moving said other portions of said wet glycol in a circulatory path and returning said other portions of said wet glycol to said first separator apparatus;

force producing apparatus having an inlet portion and an outlet portion and located in said circulatory path so that said other portions of said wet glycol pass through said force producing apparatus to produce a force;

fourth transfer apparatus extending between said force producing apparatus and said second separator apparatus and using said force to transfer at least said uncondensed vapors from said second separator apparatus to said force producing apparatus; and said force producing apparatus entraining said at least said uncondensed vapors in said other portions of said wet glycol to be returned therewith to said first separator apparatus.

15. Apparatus in claim 14 wherein said force producing apparatus comprises:

an educator having said inlet portion, said outlet portion and a vacuum portion;

said educator located in said circulatory path so that said other portions of said wet glycol pass through said educator to create a vacuum therein; and said fourth transfer apparatus having at least a portion thereof connected to said vacuum portion so that said vacuum draws said at least said uncondensed vapors from said second separator apparatus.

16. Apparatus as in claim 14 wherein said condenser comprises:

an elongated hollow shell having an inlet port and an outlet port and connected in said circulatory path so that said other portions of said wet glycol flow through said hollow shell;

at least one tube in sealed engagement with and extending through said hollow shell and having an inlet and an outlet and connected to said second and third transfer apparatus so that said effluent passes through said at least one tube and is converted into liquid water, liquid hydrocarbons and said uncondensed vapors.

17. Apparatus as in claim 16 and further comprises:

dividing apparatus for dividing said circulatory path into a first path and a second path;

combining apparatus for combining said first path and said second path back into said circulatory path;

heat exchanger apparatus located in said first path so that any portion of said other portions of wet glycol in said first path passes through said heat exchanger apparatus;

said heat exchanger apparatus raising the temperature of said any portion of said other portions of wet glycol passing therethrough;

control apparatus for controlling the flow of said other portions of wet glycol through said first path or said second path;

said second path passing through said condenser; and first thermostat apparatus for operating said control apparatus.

18. Apparatus as in claim 17 and further comprising:

an open ended housing surrounding said condenser;

cooling apparatus located in said open ended housing to cool said effluent in said at least one tube; and apparatus for controlling the operation of said cooling apparatus.

19. Apparatus as in claim 14 wherein:

said portions of said wet glycol being transferred in said first transfer apparatus are in an amount substantially equal to the amount of wet glycol received by said first separator apparatus from said absorber.

20. Apparatus as in claim 14 wherein said condenser comprises:

at least one elongated tube having an inlet connected to said second transfer apparatus to receive said effluent and an outlet connected to said third transfer apparatus;

an open ended housing surrounding said elongated tube;

cooling apparatus located in said open ended housing to cool said effluent in said elongated tube; and first thermostat apparatus for controlling the operation of said cooling apparatus.

21. Apparatus as in claim 20 and further comprising:

dividing apparatus for dividing said circulatory path into a first path and a second path;

combining apparatus for combining said first path and said second path back into said circulatory path;

heat exchanger apparatus located in said first path so that any portion of said other portions of said wet glycol in said first path passes through said heat exchanger apparatus;

said heat exchanger apparatus raising the temperature of said any portion of said other portions of said wet glycol passing therethrough;

control apparatus for controlling the flow of said other portions of wet glycol through said first path or said second path; and second thermostat apparatus for operating said control apparatus.

22. Apparatus as in claim 14 and further comprising:

said first separator apparatus also containing gaseous hydrocarbons and liquid hydrocarbons so that said first separator apparatus has at least an upper portion having said hydrocarbon gases located therein, an intermediate portion having said liquid hydrocarbons located therein and a lower portion having said wet glycol located therein;

liquid level control apparatus in said first separator apparatus for controlling the amount of said at least portions of said wet glycol being transferred by said first transfer apparatus;

wet glycol level control apparatus in said first separator apparatus for sensing the level of said wet glycol in said first separator apparatus;

dumping apparatus associated with said first separator apparatus for dumping at least portions of said liquid hydrocarbons from said first separator apparatus;

said dumping apparatus having valve apparatus for movement between an opened and a closed position; and control apparatus associated with said glycol level control apparatus and said dumping apparatus for moving said valve apparatus to said opened or said closed position when said wet glycol level control apparatus is at predetermined levels.

23. Apparatus as in claim 22 wherein said liquid level control apparatus comprises:

at least a portion of said dumping apparatus comprises a solenoid valve;

a hollow tube mounted on said first separator apparatus and having a lower end portion located below said predetermined levels;

a control switch located in said hollow tube in an electric circuit with said solenoid valve and movable between an opened and closed position;

a float mounted for sliding movement over said hollow tube;

said float having a weight so that it will float on said wet glycol; and switch control apparatus in said float for moving said control switch between said opened or closed position.

24. Apparatus for use with a natural gas dehydrator wherein a supply of natural gas is fed into an absorber wherein it is subjected to dry glycol to remove undesirable materials, including water, therefrom so that the dry glycol is changed into wet glycol that is removed from the absorber comprising:

- first separator apparatus containing a supply of wet glycol and located to receive wet glycol from said absorber;
- reboiler apparatus having a still column for converting wet glycol to dry glycol and effluent;
- first transfer apparatus for transferring at least portions of said wet glycol in said first separator apparatus to said still column of said reboiler apparatus;
- second transfer apparatus for transferring said effluent from said reboiler to condenser apparatus;
- said condenser apparatus converting said effluent into at least liquids and uncondensed vapors;
- second separator apparatus;
- third transfer apparatus for transferring said liquids and said uncondensed vapors to said second separator apparatus;
- circulating apparatus for removing other portions of said wet glycol from said first separator apparatus, moving said other portions of said wet glycol in a circulatory path and returning said other portions of said wet glycol to said first separator apparatus;
- said second separator apparatus separating at least said uncondensed vapors from said liquids; and
- fourth transfer apparatus for entraining said at least said uncondensed vapors into said circulating other portions of said wet glycol to be returned therewith to said first separator apparatus.

25. Apparatus as in claim 24 wherein:

- storage tank apparatus for receiving dry glycol from said reboiler and having a heat exchanger located therein;
- said at least portions of said wet glycol in said first transfer apparatus being in an amount substantially equal to the amount of wet glycol received from said absorber; and
- said at least portions of said wet glycol in said first transfer apparatus passing through said heat exchanger in said storage tank to raise the temperature of said portion of wet glycol prior to the transfer thereof to said still column.

26. Apparatus for use with a natural gas dehydrator wherein a supply of natural gas is fed into an absorber wherein it is subjected to dry glycol to remove undesirable materials, including water, therefrom so that the dry glycol is changed into wet glycol that is removed from the absorber and transferred to a first separator apparatus and at least a portion thereof is transferred to a still column comprising:

- said first separator apparatus also containing gaseous hydrocarbons and liquid hydrocarbons so that said first separator apparatus has at least an upper portion having said hydrocarbon gases located therein, an intermediate portion having said liquid hydrocarbons located therein and a lower portion having said wet glycol located therein;
- liquid level control apparatus in said first separator apparatus for controlling the amount of said at least portions of said wet glycol being transferred by said first transfer apparatus;
- wet glycol level control apparatus in said first separator apparatus for sensing the level of said wet glycol in said first separator apparatus;
- dumping apparatus associated with said first separator apparatus for dumping at least portions of said liquid hydrocarbons from said first separator apparatus;
- said dumping apparatus having valve apparatus for movement between an opened and a closed position; and
- control apparatus associated with said glycol level control apparatus and said dumping apparatus for moving said valve apparatus to said opened or said closed position when said wet glycol level control apparatus is at predetermined levels.

27. Apparatus as in claim 26 wherein said liquid level control apparatus comprises:

- at least a portion of said dumping apparatus comprises a solenoid valve;
- a hollow tube mounted on said first separator apparatus and having a lower end portion located below said predetermined levels;
- a control switch located in said hollow tube in an electric circuit with said solenoid valve and movable between an opened and a closed position;
- a float mounted for sliding movement over said hollow tube;
- said float having a weight so that it will float on said wet glycol; and
- switch control apparatus in said float for moving said control switch between said opened or closed portion.

* * * * *